United States Patent [19]

Yoshida et al.

[11] Patent Number: 5,590,943
[45] Date of Patent: Jan. 7, 1997

[54] REAR PROJECTION TYPE IMAGE DISPLAY APPARATUS AND TRANSMISSION TYPE SCREEN USED THEREIN

[75] Inventors: Takahiko Yoshida, Miura; Koji Hirata, Kamakura; Atsuo Osawa; Kiyoshi Wada, both of Yokohama; Hiroki Yoshikawa, Hiratsuka, all of Japan

[73] Assignee: Hitachi, Ltd., Tokyo, Japan

[21] Appl. No.: 77,780

[22] Filed: Jun. 18, 1993

[30] Foreign Application Priority Data

Jun. 19, 1992 [JP] Japan .................................. 4-160516

[51] Int. Cl.$^6$ ................................................ G03B 21/28
[52] U.S. Cl. ............................. 353/74; 353/77; 359/456; 359/460
[58] Field of Search ........................... 353/74, 77, 78; 359/443, 449, 454, 455, 456, 457, 460

[56] References Cited

U.S. PATENT DOCUMENTS

| | | | |
|---|---|---|---|
| 4,536,056 | 8/1985 | Ogino | 359/457 |
| 4,636,035 | 1/1987 | Clauser et al. | 359/457 |
| 4,725,134 | 2/1988 | Ogino | 359/457 |
| 4,752,116 | 6/1988 | Sekiguchi | 359/457 |
| 4,919,518 | 4/1990 | Ogino et al. | 359/457 |
| 4,936,652 | 6/1990 | Clausen et al. | 359/459 |
| 4,961,642 | 10/1990 | Ogino | 359/457 |
| 4,963,007 | 10/1990 | Moskovich . | |
| 5,066,099 | 11/1991 | Yoshida | 359/457 |
| 5,184,224 | 2/1993 | Mitani et al. | 359/456 |
| 5,269,922 | 3/1994 | Mitari et al. | 359/457 |
| 5,289,311 | 2/1994 | McClellard et al. | 359/460 |

FOREIGN PATENT DOCUMENTS

| | | |
|---|---|---|
| 1-250916 | 11/1989 | Japan . |
| 3-246512 | 6/1991 | Japan . |
| 3-276113 | 9/1991 | Japan . |
| 4-119444 | 5/1992 | Japan . |

*Primary Examiner*—William C. Dowling
*Attorney, Agent, or Firm*—Antonelli, Terry, Stout & Kraus

[57] ABSTRACT

A transmission screen for a rear projection type image display apparatus having at least one image generation source for displaying images, at least one projection lens for enlarging and projecting images displayed on the at least one image generation source onto a rear portion of the transmission screen for display. The transmission screen of the image display apparatus enables display of the images projected onto the transmission screen with a contrast of at least 70. Further, the transmission screen enables display with a field angle within a range of at least 72° to less than 100°. The transmission screen also includes a glossy light absorbing layer and a substantially smooth mirror surface at a light exit surface thereof.

54 Claims, 14 Drawing Sheets

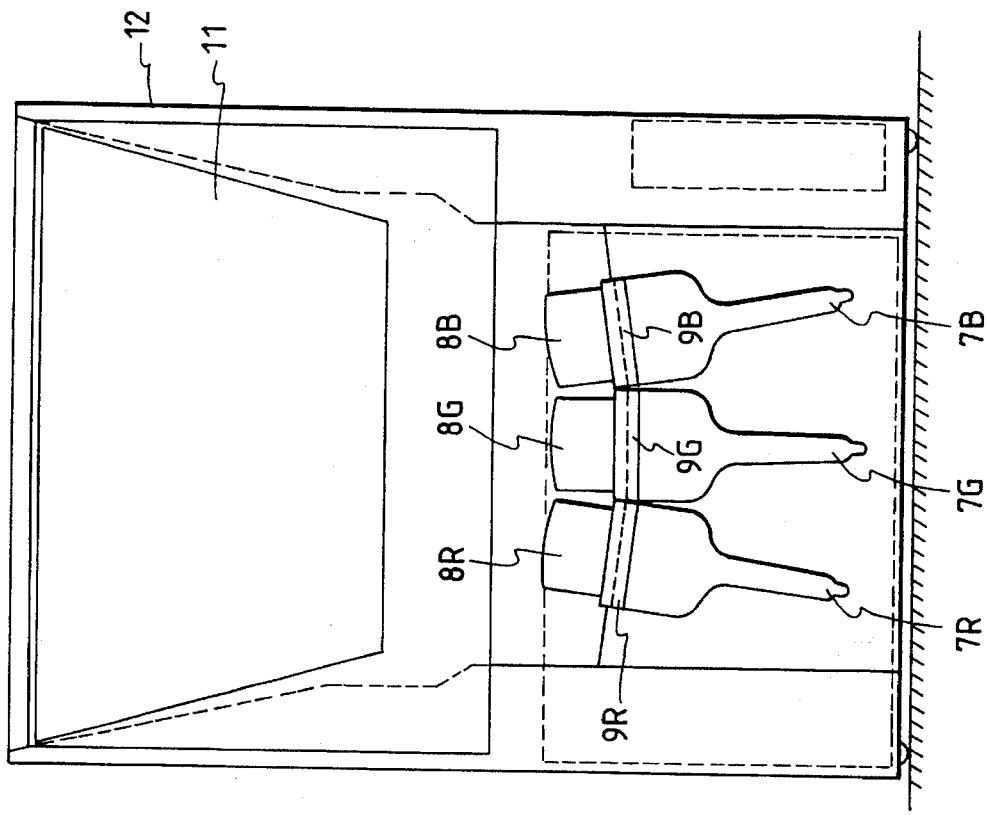
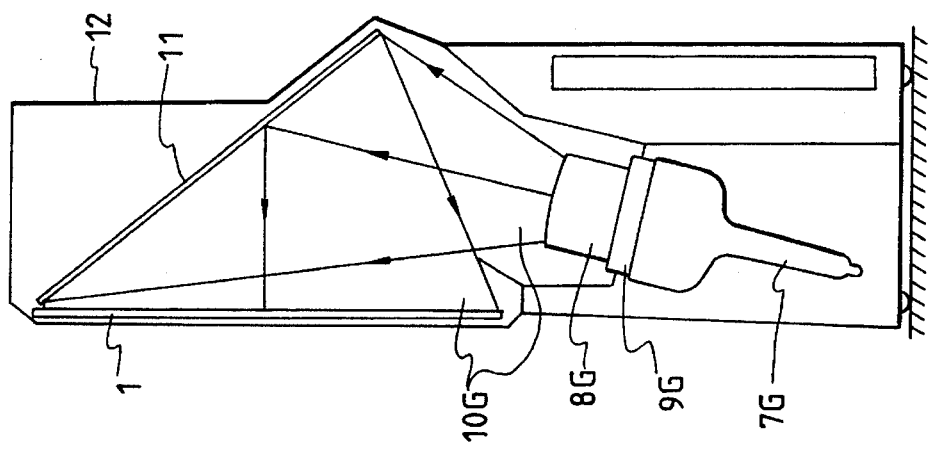

5,590,943

1

REAR PROJECTION TYPE IMAGE DISPLAY APPARATUS AND TRANSMISSION TYPE SCREEN USED THEREIN

BACKGROUND OF THE INVENTION

This application relates to U.S. application Ser. No. 07/938,861 filed Sep. 1, 1992, now U.S. Pat. No. 5,400,114 and Ser. No. 07/994,101 filed Dec. 21, 1992, now abandoned the subject matter of which is incorporated by reference herein.

The present invention relates to a rear projection type image display apparatus and a transmission type screen for use therein.

A rear projection type image display apparatus such as, for example, a television receiver wherein images displayed on a small-sized image generation source, e.g. a projection type cathode-ray tube, are enlarged by a projection lens and then projected on a transmission type screen from the back of the screen, has recently become more and more popular for domestic and business use because of a remarkable improvement of image quality and a large picture plane of the screen permits the viewer to enjoy a powerful attendance feeling.

According to the prior art, in the case where a projection type cathode ray tube is used as an image generation source in such rear projection type image display apparatus, a cathode-ray tube and a projection lens are usually combined together with respect to each of the three primary colors of red, green and blue, and images of the three primary colors are combined on the transmission type screen.

FIG. 25 is a sectional side view showing an internal construction of a rear projection type television receiver for domestic use as a conventional rear projection type image display apparatus.

In FIG. 25, there is shown a transmission type screen 1, a projection type cathode-ray tube of green 7G, a projection lens 8G for the projection type cathode-ray tube 7G, a coupler 9G for coupling the cathode-ray tube 7G and the projection lens 8G with each other, a projection light beam of green 10G, a reflecting mirror 11 and a housing 12. As the projection lens 8G in the rear projection type television receiver for domestic use as the conventional rear projection type image display apparatus, there is mainly used a projection lens of a combined construction involving a convex glass lens element and a methacrylic resin lens element such as those disclosed, for example, in Japanese Patent Laid Open Nos. 250916/89, 246512/91 and 276113/91 and U.S. Pat. No. 4,963,007. As the transmission type screen 1, there is mainly used a transmission type screen of a two-sheet construction consisting of a Fresnel lens sheet and a lenticular lens sheet having a light diffusing material, e.g. glass beads, such as those disclosed, for example, in Japanese Patent Laid Open Nos. 117226/81 and 59436/83.

A more detailed description will be provided below about the transmission type screen of a two-sheet construction which has generally been employed in the conventional rear projection type image display apparatus referred to above.

FIG. 26 is a perspective view showing a principal portion of the transmission type screen 1 in the rear projection type image display apparatus illustrated in FIG. 25. In FIG. 26, there is shown the transmission type screen comprising a Fresnel lens sheet disposed on the side of an image generation source (the picture plane of a cathode-ray tube), and a lenticular lens sheet 4 disposed on an image viewing side. Reference numerals 20 and 40 denote base materials of the Fresnel lens sheet 2 and the lenticular lens sheet 4, respectively, each being a transparent thermoplastic resin.

In the base material 40 of the lenticular lens sheet 4 there are dispersed fine particles of a light diffusing material for the scattering of light. In addition to the case where the fine particles of the light diffusing material are dispersed in the interior of the lenticular lens sheet, there also is the case where such fine particles are laminated as a light diffusing layer on the sheet surface. Reference numerals 21 and 22 denote a light incidence surface and a light exit surface, respectively, of the Fresnel lens sheet 2, the light incidence surface 21 being a plane and the light exit surface 22 being in the shape of a convex Fresnel lens.

Reference numeral 41 denotes a light incidence surface of the lenticular lens sheet 4. The light incidence surface 41 comprises a plurality of first vertical lenticular lenses arranged in the horizontal direction of the picture plane of the screen, the first lenticular lenses extending in the vertical direction of the picture plane. Reference numeral 42 denotes a light exit surface of the lenticular lens sheet 4 which comprises a plurality of second vertical lenticular lenses similar in shape and substantially in an opposed relation to the first vertical lenticular lenses of the light incidence surface 41. In the light exit surface 42, a convex portion 43 is formed between adjacent lenticular lenses, and a light absorbing band (black stripe) 16 is laminated as a glossless layer of a black colored material.

In the above conventional transmission type screen, light rays emitted from various points of images displayed on the surface of a projection type cathode ray tube pass through projection lenses (not shown), then enter the light incidence surface 21 of the Fresnel lens sheet 2 and are thereafter converted to substantially parallel light rays by the Fresnel lens of the light exit surface 22, which parallel light rays then enter the lenticular lens sheet 4.

The light rays thus incident on the lenticular lens sheet 4 then travel toward a focal point near the second vertical lenticular lens faces on the light exit surface 42 under the action of the first vertical lenticular lenses on the light incidence surface 41. From that focal point, the light rays diffuse in the horizontal direction of the picture plane of the screen and emerge on the image viewing side while being diffused in both vertical and horizontal directions of the picture plane of the screen by means of the fine particles of the light diffusing material dispersed within the base material 40.

In the above conventional transmission type screen, the directivity in the vertical direction of the screen can be enhanced by increasing the amount of the light diffusing material dispersed in the base material of the lenticular lens sheet 4.

On the other hand, in the above conventional transmission type screen, if there is an extraneous light, e.g. illuminating light, about half of the extraneous light will enter the light absorbing band 16 provided on the light exit surface 42 of the lenticular lens sheet 4. Most the light rays thus incident on the light absorbing band 16 are absorbed by the light absorbing band 16 other than only a portion thereof which are diffused and reflected.

A further description will be provided below concerning the manner in which the light rays incident on the transmission type screen 1 are diffused by the fine particles of the light diffusing material dispersed within the base material 40 of the lenticular lens sheet 4.

FIG. 27 is a vertical sectional view of the transmission type screen 1 shown in FIG. 26, in which reference numeral 14 represent light rays incident on the screen 1.

In the lenticular lens sheet 4', as shown in FIG. 27, the incident light rays 14 travel ahead while being diffused by the light diffusing material 15 in the base 40, and pass out from the light exit surface 42. Therefore, a light ray width, d, as viewed from the image viewing side is larger than the width of the incident light rays 14, so that the scanning line width or picture element size on the light exit surface 42, when images are projected on the transmission type screen 1, becomes larger, resulting in an image focusing characteristic which is deteriorated and in which the images blur.

Further, in the lenticular lens sheet 4', the incident light rays 14 are not only diffused by the light diffusing material 15 in the base 40 but also scattered, so a portion of the light rays are reflected again toward the light incidence surface 41 or become stray light rays in the lenticular lens sheet 4', or are absorbed by the light absorbing band 16, thus not reaching the focal point near the light exit surface 42 and hence not emerging from the light exit surface 42, with the result that the brightness of the picture plane of the screen viewed from the image viewing side is deteriorated.

Of the incident light rays 14, those which have been scattered by the light diffusing material 15 and become stray light rays as mentioned above reciprocate as unnecessary reflected light rays within the projection optical system, then a portion thereof eventually reach the light exit surface 42 of the lenticular lens sheet 4', so that the image contrast is deteriorated. Further, when there is an extraneous light such as an illuminating light for example, about half of the extraneous light enters the light absorbing band 16 of the lenticular lens sheet 4, as mentioned above, but the remainder enters the second vertical lenticular lenses of the light exit surface 42 and is diffused and reflected by the light diffusing material 15, thus also causing a lowering of the image contrast.

In the conventional rear projection type image display apparatus such as the conventional rear projection type television receiver using the foregoing projection lenses and transmission type screen, there have been the following problems.

(1) A good image contrast is not obtained. Particularly, in the presence of an extraneous light such as an illuminating light for example, the entire image has a tinge of white color and the contrast is 65 or so, which is markedly inferior to the contrast (about 100) obtained in the absence of extraneous light. This is ascribable to the presence of the light diffusing material in the transmission type screen.

(2) Images blur. This is greatly influenced by the fact that there is substantial aberration in the conventional projection lenses and the conventional transmission type screen light diffusing material.

(3) The directivity in the vertical direction of the picture plane of the screen is narrow. This is because if the amount of the light diffusing material in the transmission type screen is increased for the purpose of enlarging the directivity, the poor contrast mentioned above in item (1) and the image blur mentioned above in item (2) become more marked, and therefore it is impossible to incorporate a large amount of the light diffusing material in the screen. For example, if the directivity in the vertical direction of the picture plane of the screen is enlarged twice, the contrast in the presence of an extraneous light such as an illuminating light becomes 30 or so.

(4) A long depth requires a large occupied area for installation. For example, in the case where the picture plane size is about 40 inches in diagonal length, the depth is required to be about 60 to 70 cm. This is ascribable to a small field angle of projection lens and a long projection distance.

(5) The marginal portion of the picture plane is darker than the center thereof. For example, at the portion near a relative image height of 0.9 in the diagonal direction of the picture plane of the screen, the brightness of the marginal portion is about 25% of that of the picture plane center. This depends on restrictions involved in lens construction in the design of projection lens. The relative image height represents a value obtained by scaling the distance from the picture plane center while assuming half of the diagonal length of the picture plane to be 1.

(6) The appearance of the rear projection type image display apparatus does not provide a high quality impression. Particularly, when no image is projected on the transmission type screen, the entire screen looks to the viewer like a glossless screen of light black color as if ink were applied thereto. This does not provide a good impression. This is because at the viewer's side surface of the screen there is no specular reflection in both the light exit surface and the light absorbing layer, with only diffuse reflection, so there is no gloss.

SUMMARY OF THE INVENTION

It is an object of the present invention to solve the above-mentioned problems of the prior art and provide a rear projection type image display apparatus and a transmission type screen for use therein, having a high image contrast, little blur, high brightness of the marginal portion of the picture plane, wide directivity in the vertical direction of the picture plane, short depth, and a high quality impression.

According to the present invention, in order to achieve the above-mentioned object, in a rear projection type image display apparatus wherein images on an image generation source are enlarged by a projection lens and then projected on a transmission type screen from the rear of the screen, the images projected on the transmission type screen have a contrast of not lower than 70 and field angle is in the range from not smaller than 72° to smaller than 100°.

In accordance with the present invention, a transmission type screen has directional characteristics such that when the direction which permits viewing a central image on the picture plane of the screen in the brightest state out of the images projected on the screen is assumed to be a reference direction, the luminance of the picture plane center is not less than 50% of the luminance in the reference direction, in a horizontal direction of 50° relative to the reference direction, it is not less than 10% of the luminance in the reference direction, in a horizontal direction of 65° relative to the reference direction, it is not less than 50% of the luminance in the reference direction, in a vertical direction of 10° relative to the reference direction, and it is not less than 10% of the luminance in the reference direction, in a vertical direction of 25° relative to the reference direction.

Moreover, in accordance with a feature of the present invention, a relative quantity of light of images located at a marginal portion of the picture plane of the transmission type screen relative to the quantity of light of an image located at a center of the picture plane, out of the images projected on the screen, is not less than 30%, and the field angle is in the range from not smaller than 72° to smaller than 100°.

Further, the present invention provides that the transmission type screen has a lustrous or glossy light absorbing layer or has a mirror surface as a light exit surface.

In the present invention, by setting the contrast of images projected on the transmission type screen at a value of not lower than 70 and the field angle at a value in the range from not smaller than 72° to smaller than 100°, it is made possible to improve the image contrast and shorten the depth.

Besides, by setting directional characteristics so as to provide such luminance of the picture plane center as noted previously, it is made possible to broaden the directivity in the vertical direction of the picture plane of the screen.

Moreover, by setting a relative quantity of light of images located at the marginal portion of the picture plane relative to the quantity of light of an image located at the picture plane center of the transmission type screen at a value of not less than 30% and by setting the field angle at a value in the range from not smaller than 72° to smaller than 100°, it is made possible to improve the brightness of the marginal portion of the picture plane.

Further, by using a lustrous or glossy light absorbing layer in the transmission type screen or by using a mirror surface as the light exit surface of the same screen, it is made possible to obtain an external appearance which provides a high quality impression.

These and other objects, features, and advantages of the present invention will become more apparent from the following description when taken in conjunction with the accompanying drawings which show, for purposes of illustration only, several embodiments of the present invention.

BRIEF DESCRIPTION OF THE DRAWINGS

FIG. 1 is a sectional side view showing an internal construction of a rear projection type image display apparatus according to an embodiment of the present invention;

FIG. 2 is a sectional front view showing an internal construction of the image display apparatus illustrated in FIG. 1;

DESCRIPTION OF THE PREFERRED EMBODIMENTS

Figure 3:
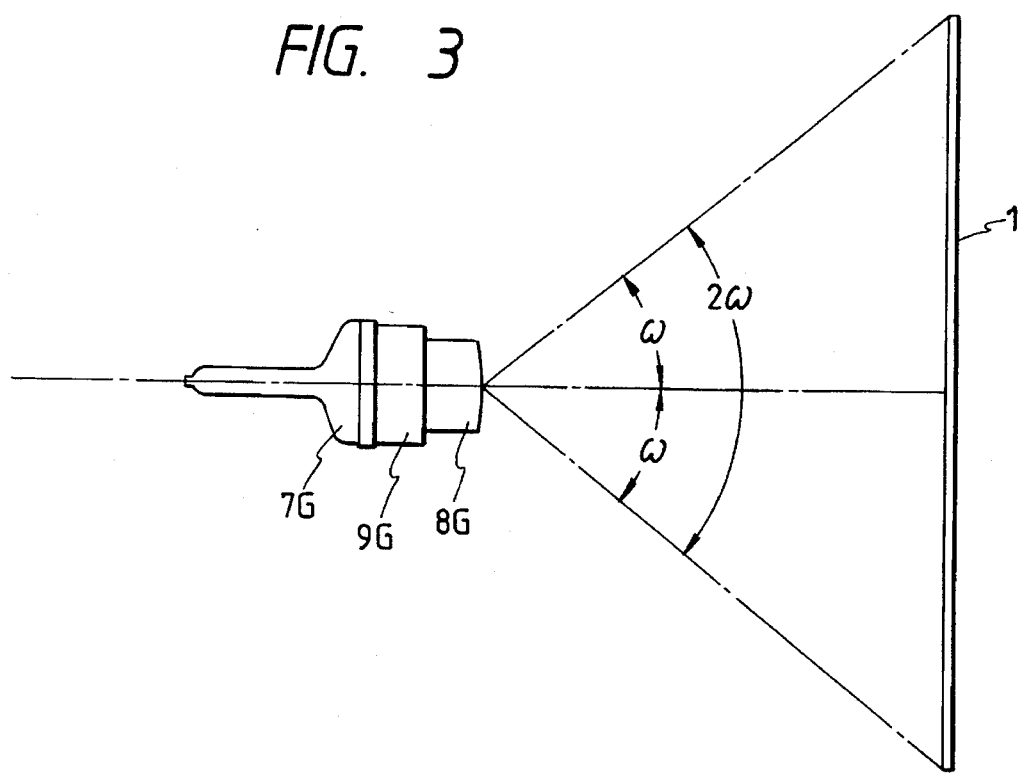
FIG. 3 is a schematic development view obtained by developing on a predetermined plane a portion of a projection optical system in the image display apparatus illustrated in FIG. 1.

Referring now to the drawings wherein like reference numerals are utilized to designate like parts throughout the views, FIG. 1 is a sectional side view showing an internal construction of a rear projection type image display apparatus according to an embodiment of the present invention. In FIG. 1, there is shown a transmission type screen 1, a projection type cathode-ray tube of green 7G, a projection lens 8G for the projection type cathode-ray tube 7G, a coupler 9G for coupling the cathode-ray tube 7G and the projection lens 8G together, a projection light beam of green 10G, a reflecting mirror 11 for reflecting the projection light beam 10G, and a housing 12.

In the rear projection type image display apparatus according to this embodiment, the depth is about 35 cm when the picture plane size is 35 inches in diagonal length and is thus extremely small in comparison with that of the conventional rear projection type image display apparatus, and substantially corresponding to the depth of a direct-view type television receiver of size 14 (about 14 inches in diagonal size of a cathode-ray tube). Thus, the image display apparatus of this embodiment is characterized in that the occupied area necessary for installation is smaller than that in the conventional corresponding apparatus. When the picture plane size is 40 inches in diagonal length, the depth is about 40 cm, which is about the same as in a direct-view type television receiver of size 19.

Further, the rear projection type image display apparatus of this embodiment is improved over the prior art in point of image contrast, blur, directional characteristic in the vertical direction of the picture plane of the screen, brightness of the marginal portion of the picture plane and the impression of the appearance. These points will be described later.

FIG. 2 is a sectional view showing an internal construction as seen from the front of the rear projection type image display apparatus illustrated in FIG. 1. In FIG. 2, reference numerals 7R, 7G and 7B denote projection type cathode-ray tubes of red, green and blue, respectively; reference numerals 8R, 8G and 8B denote projection lenses for the projection type cathode-ray tubes 7R, 7G and 7B, respectively; reference numerals 9R, 9G and 9B denote couplers for coupling the cathode-ray tubes 7R, 7B and 7B with the projection lenses 8R, 8G and 8B, respectively; reference numeral 11 denotes a reflecting mirror for reflecting the projection light beam 10G and corresponding projection light beams 10R and 10B; and reference numeral 12 denotes a housing.

In the rear projection type image display apparatus of this embodiment, the width and height are about 75 cm and about 105 cm, respectively, when the picture plane size is 35 inches in diagonal size, thus about the same as those of a direct-view type television receiver of size 29 (about 29 inches in diagonal size of a cathode-ray tube). For home use, therefore, if a rear projection type television receiver of a larger size of size 35 according to the present invention is installed in a place where a conventional direct-view type television receiver of size 29 has heretofore been installed, the installing area becomes smaller and it is possible to enjoy a large picture plane.

FIG. 3 is a schematic development view on a predetermined plane of a portion of a projection optical system used in the rear projection type image display apparatus of FIG. 1. More specifically, in the optical path from the projection type cathode-ray tube 7G of green to the transmission type screen 1, the bending of the optical path by the reflecting mirror 11 is eliminated and a portion of the optical system is developed on a plane including a central point of the light exit surface of the projection lens 8G for green and also including diagonal lines on the picture plane of the transmission type screen 1.

Generally, the angle at which a diagonal line of image is viewed from the center of exit pupil of a projection lens is called a field angle, and a half thereof is called a half field angle. However, it is difficult to actually measure such field angle because the exit pupil of a projection lens is imaginary.

Usually, the exit pupil of a projection lens is closer to a projection type cathode-ray tube by a distance of about 20 to 30 mm from the light exit surface of a lens element of the projection lens which is located in the closest position to the transmission screen side, and this distance is very short in comparison with the projection distance from the projection lens to the screen. In this specification, therefore, as approximate definitions, the angle at which diagonal lines on the picture plane of the transmission type screen 1 are viewed from a central point of the light exit surface of the projection lens 8G for green is assumed to be a field angle of $2\omega$, and a half of it is assumed to be a half field angle, as shown in FIG. 3.

In the rear projection type image display apparatus of this embodiment, when the picture plane size is 35 inches in diagonal size, the projection distance from the light exit surface of the projection lens up to the transmission type screen is about 560 mm, the diagonal size of the screen is about 890 mm, and the field angle $2\omega$ is about 77°. In the conventional rear projection type image display apparatus, since the field angle is as small as, say, 56° to 66°, the depth is about 60 to 70 cm in the picture plane size of 40 inches as a diagonal size and thus it has been impossible to make the depth sufficiently small. On the other hand, in the rear projection type image display apparatus of this embodiment, it is made possible to enlarge the field angle and make the depth small by shortening the focal length of the projection lens. As to shortening the focal length of the projection lens, it will be described later.

At a field angle $2\omega$ slightly exceeding 90°, it gradually becomes difficult to obtain such a construction of the rear projection type image display apparatus as shown in FIG. 1 in which the optical path from the projection lens up to the transmission type screen is bent by the reflecting mirror 11. Further, at a field angle $2\omega$ exceeding 100° or so it becomes impossible to obtain such construction and hence it becomes impossible to reduce the depth of the rear projection type image display apparatus.

Figure 4:
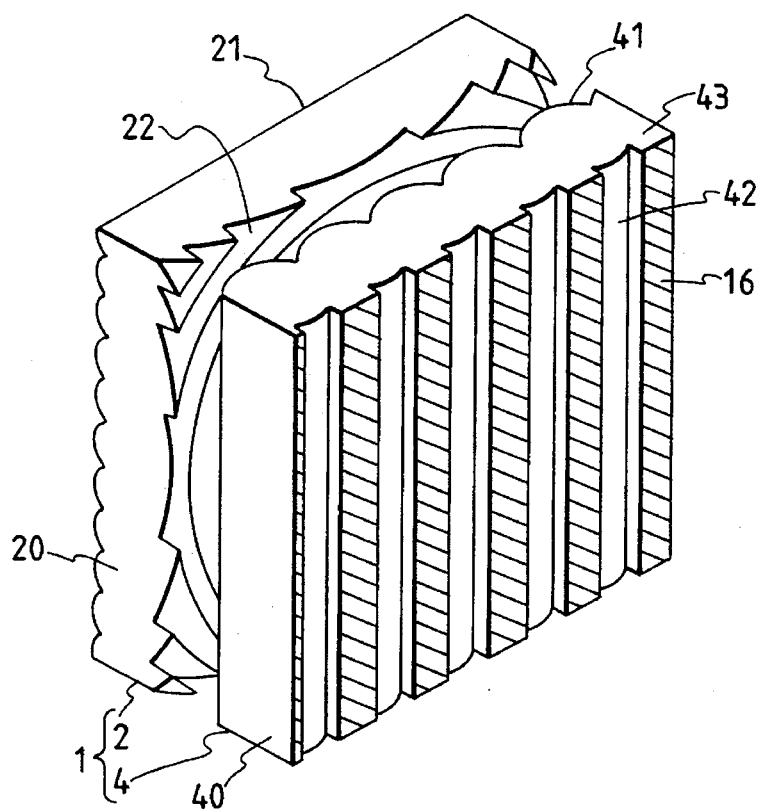
FIG. 4 is a perspective view showing a principal portion of a transmission type screen 1 in the image display apparatus of FIG. 1.

The following description is now provided about the transmission type screen used in the rear projection type image display apparatus of this embodiment, wherein FIG. 4 is a perspective view showing a principal portion of the transmission type screen 1 used in the rear projection type image display apparatus of FIG. 1.

In FIG. 4, reference numeral 2 denotes a Fresnel lens sheet and reference numeral 4 denotes a lenticular lens sheet. The Fresnel lens sheet 2 and the lenticular lens sheet 4 are fixed to each other at respective end portions (not shown). Reference numerals 20 and 40 represent base materials of the lens sheets 2 and 4, respectively, which materials are each a substantially transparent thermoplastic resin material. Reference numeral 21 denotes a light incidence surface of the Fresnel lens sheet 2. The light incidence surface 21 has a shape such that a plurality of lenticular lenses which extend in the horizontal direction of the picture plane of the screen are arranged continuously in the vertical direction of the picture plane. Reference numeral 22 denotes a light exit surface of the Fresnel lens sheet 2, which surface is in the shape of a convex Fresnel lens. Reference numeral 41 denotes a light incidence surface of the lenticular lens sheet 4. The light incidence surface 41 has a shape such that a plurality of first lenticular lenses which extend in the vertical direction of the picture plane of the screen are arranged continuously in the horizontal direction of the picture plane. Reference numeral 42 denotes a light exit surface of the lenticular lens sheet 4. The light exit surface 42 has a shape such that a plurality of second lenticular lenses which are long in the vertical direction of the picture plane of the screen are arranged continuously in the horizontal direction of the picture plane substantially in an opposed relation to the first vertical lenticular lenses of the light incidence surface 41. Further, a convex portion 43 is formed in a boundary portion between adjacent second lenticular lenses, and a light absorbing band 16 of a finite width is formed thereon.

As shown in FIG. 4, this embodiment is different in the following four points from the conventional transmission type screen shown in FIG. 26. (1) Horizontal long lenticular lenses are provided in the light incidence surface 21 of the Fresnel lens sheet 2. (2) The thickness of the Fresnel lens sheet 2 is reduced to about the thickness as the lenticular lens sheet 4. (3) Fine particles of a light diffusing material are not dispersed in the base material 40 of the lenticular lens sheet 4. (4) Further, the shape of the first vertical lenticular lenses of the light incidence surface 41 of the lenticular lens sheet 4 and that of the second vertical lenticular lenses of the light exit surface 42 of the sheet 4 are different from the conventional shapes.

Of the above differences, the point that a light diffusing material is not dispersed in the base material 40 of the lenticular lens sheet 4 is effective in improving the contrast of image in the rear projection type image display apparatus and also effective in diminishing the blur of image. The point that the Fresnel lens sheet 2 is thin is also effective in diminishing the blur of image.

As to the horizontal lenticular lenses of the light incidence surface 21 of the Fresnel lens sheet 2, as well as the first and second vertical lenticular lenses of the light incidence surface 41 and the light exit surface 42, respectively, of the lenticular lens sheet 4, it is possible, by a novel lens shape design, to obtain a directional characteristic of a wide skirt as a directional characteristic of the transmission type screen. The details will be described later.

Next, in connection with the Fresnel lens sheet 2 and lenticular lens sheet 4 which constitute the transmission type screen 1 shown in FIG. 4, the Fresnel lens sheet 2 will first be described below in detail. As in the case of the Fresnel lens sheet used in the conventional transmission type screen, the convex Fresnel lens provided as the light exit surface 22 of the Fresnel lens sheet 2 functions to transform projected image light rays of red, green and blue which are incident on the entirety of the light incidence surface 21 into substantially parallel light rays of each color and direct them to the lenticular lens sheet 4. This point will be described below.

Figure 5:
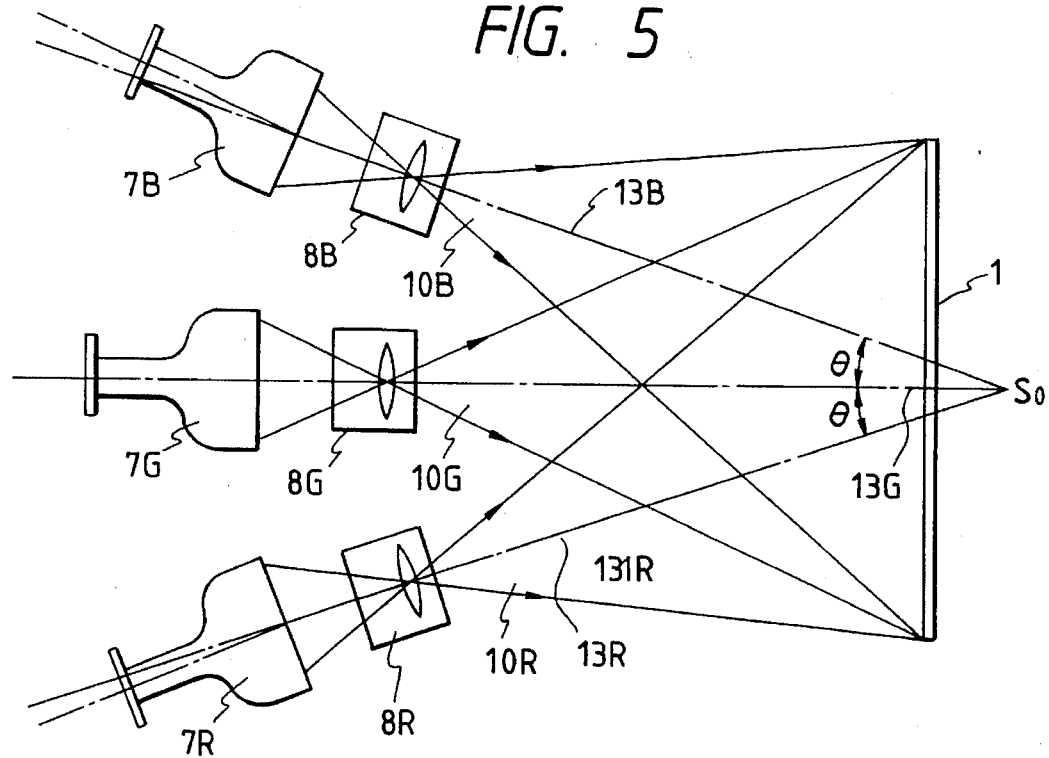
FIG. 5 is a schematic development view obtained by developing on a horizontal plane the projection optical system in the image display apparatus of FIG. 1.

FIG. 5 is a schematic development view on a horizontal plane of the projection optical surface used in the rear projection type image display apparatus of FIG. 1. In FIG. 5, reference numerals 10R, 10G and 10B denote projection light beams of red, green and blue, respectively; and numerals 13R, 13G and 13B denote optical axes of the projection lenses 8R, 8G and 8B, respectively, which optical axes join together at an optical axis converging angle θ at one point $S_o$ near the center of the transmission type screen 1. In FIG. 1 the reflecting mirror 11 for reflecting the projection light beam 10G is drawn as a constituent of the rear projection type image display apparatus, while in the development view of FIG. 5 the reflecting mirror 11 is omitted.

In FIG. 5, the projection light beams 10R, 10G and 10B enter the transmission type screen 1. As a result, with respect to the picture elements of an image on the screen 1, when light rays of one specific color, for example, red are observed, it is seen that main light rays of the picture elements enter the screen 1 not as parallel rays, but in directions away from one another relative to the main light ray of a central picture element on the screen 1. At this time, the main light ray direction of each picture element on the screen corresponds to the highest light intensity direction, so for a viewer present in a certain position, only a portion of image looks bright and the surroundings thereof look very dark.

On the other hand, the Fresnel lens sheet 2 used in the transmission type screen 1, like the Fresnel lens sheet used in the conventional transmission type screen, functions to transform the light beams of an image incident on the whole of the light incidence surface 21 into substantially parallel light rays for each of red, green and blue through the convex Fresnel lens of the light exit surface 22 and direct them to the lenticular lens sheet 4, whereby the brightness distribution on the picture plane of the screen 1 can be improved.

At this time, in FIG. 5, the optical axis 13G of green intersects the optical axes 13R and 13B of red and blue, respectively, at the optical axis converging angle θ. As a result, in the picture elements on the screen 1, main light rays of red, green and blue enter the Fresnel lens sheet 2 at angles different from one another and pass out from the same sheet also at different angles. Consequently, the angles of incidence of the red, green and blue light rays on the lenticular lens sheet 4 are also different from one another.

When the projection light beams of red, green and blue are diffused in the horizontal direction of the screen picture plane by means of the lenticular lens sheet 4, the main light ray direction of each color is the brightest direction for each picture element, so the balance of the three primary colors—red, green and blue—varies according to image viewing positions of the viewer in the horizontal direction, and the image color appears to vary. This phenomenon is called "color shift."

On the other hand, the light incidence surface 21 of the Fresnel lens sheet 2 is provided with horizontal lenticular lenses which extend in the horizontal direction of the screen picture plane. These horizontal lenticular lenses have a function of diffusing incident light rays in the vertical direction of the picture plane.

Figure 6:
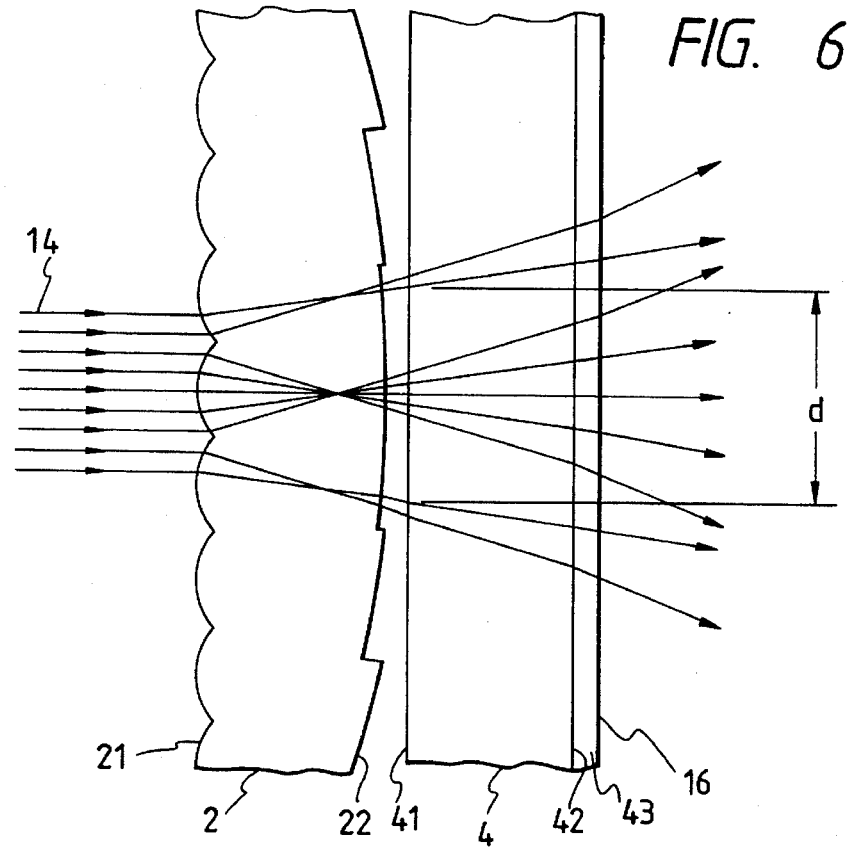
FIG. 6 is a vertical sectional view of the transmission type screen 1 shown in FIG. 4.

FIG. 6 is a vertically sectional view of the transmission type screen 1 shown in FIG. 4. In FIG. 6, reference numeral 14 represent incident light rays, and other portions common to FIG. 4 are indicated by the same reference numerals as in FIG. 4 and explanations thereof are omitted. As shown in FIG. 6, when the incident light rays 14 enter the screen through the horizontal lenticular lenses of the light incidence surface 21, even if the light rays are of the same scanning lines or picture elements, there occurs a difference in the angle of incidence due to a difference in the incident position on the light incidence surface 21, so that the light rays are refracted at different angles and are diffused in the vertical direction of the picture plane.

Now, the lenticular lens sheet 4 will be described. In FIG. 4, the first vertically long lenticular lenses which constitute the light incidence surface 41 of the lenticular lens sheet 4 function to diffuse the projection image light rays which have emerged from the Fresnel lens sheet 2, in the horizontal direction of the picture plane for each picture element and then allow the light rays to pass out to the image viewing side.

The first vertical lenticular lenses are of a shape such that a portion of a columnar surface having an aspherical sectional shape close to an elliptical shape is arranged plurally in a continuous manner. As in the case of the horizontal lenticular lenses of the light incidence surface 21 of the Fresnel lens sheet 2 referred to above, when the incident light rays enter the first vertical lenticular lenses, even if the light rays are of the same scanning line or scanning lines, there occurs a difference in the angle of incidence due to a difference in the incident position on the light incidence surface 41, so the light rays are refracted at different angles, then substantially converge near the front and the rear of the lens surfaces of the second vertical lenticular lenses which constitute the light exit surface 42, and thereafter diffuse in the horizontal direction of the picture plane.

The second vertical lenticular lenses which constitute the light exit surface 42 of the lenticular lens sheet 4 each have a columnar surface of a sectional shape which is nearly symmetric with the sectional shape of the first vertical lenticular lenses. The second vertical lenticular lenses have a function of making directional characteristics of the exit light beams of red, green and blue generally parallel with one another with respect to their incident light beams, whereby the color shift which will be described later can be diminished greatly.

On the other hand, the light rays incident on the first vertical lenticular lenses converge once in the vicinity of the second vertical lenticular lenses, so in the light exit surface 42 there is a portion through which the light rays do not pass. In view of this point, the portion 43 is provided near that portion and the light absorbing band 16 of finite width is provided thereon. In the event of incidence of an extraneous light such as an illuminating light, the light absorbing band 16 functions to absorb a portion of the extraneous light without reflecting it.

According to the construction of this embodiment, as mentioned previously, since the diffusion of light in the vertical direction of the picture plane of the screen is performed by the horizontal lenticular lenses which constitute the light incidence surface 21 of the Fresnel lens sheet 2, fine particles of a light diffusing material are not dispersed within the base material 40 of the lenticular lens sheet 4 unlike the lenticular sheet used in the conventional transmission type screen. Consequently, the image contrast is improved and it is possible to diminish the blur of image. The details of this point will be described below.

As shown in FIG. 6, the thickness of the Fresnel lens sheet 2 is about the same as that of the lenticular lens sheet 4, so that the horizontal lenticular lenses of the light incidence surface 21 in the Fresnel lens sheet 2 and the vertical lenticular lenses of the light incidence surface 41 in the lenticular lens sheet 4 are close to each other.

The light rays 14 incident on the Fresnel lens sheet 2 are first diffused in the vertical direction of the picture plane of the screen by the horizontal lenticular lenses of the light incidence surface 21 and immediately thereafter are diffused in the horizontal direction of the picture plane by the vertical lenticular lenses of the light incidence surface 41 in the lenticular lens sheet 4. That is, the start point of light diffusion of the incident light rays 14 in the horizontal direction of the picture plane and that in the vertical direction of the picture plane are close to each other.

Figure 26:
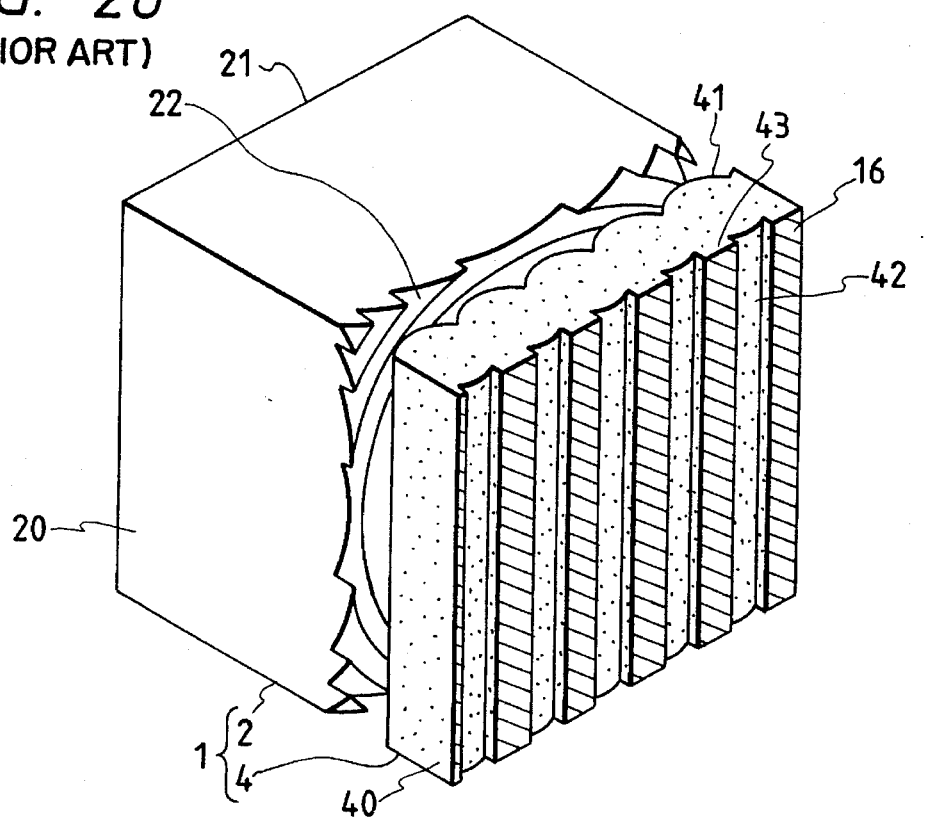
FIG. 26 is a perspective view showing a principal portion of a transmission type screen 1 in the rear projection type image display apparatus of FIG. 25.
Figure 27:
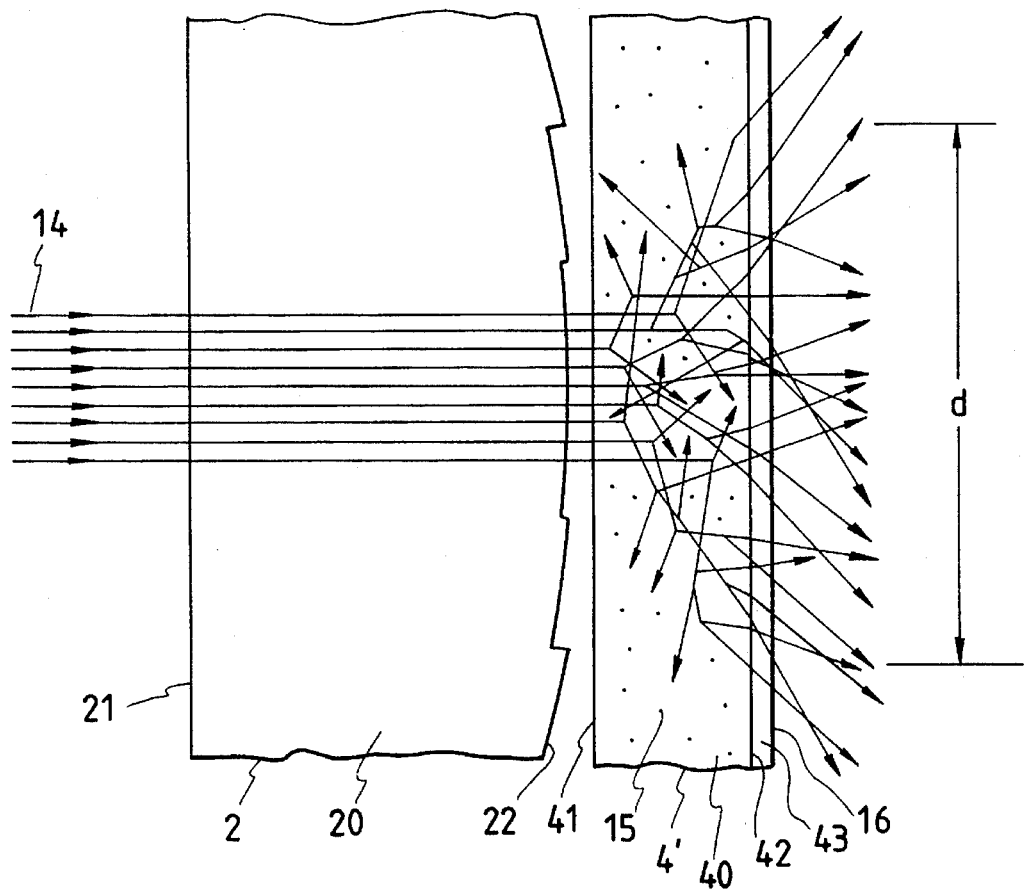
FIG. 27 is a vertical sectional view of the transmission type screen 1 shown in FIG. 26.

In the conventional transmission type screen 1 shown in FIG. 26, as noted previously, since fine particles of a light diffusing material are dispersed in the base material 40 of the lenticular lens sheet 4, the light rays incident on the light incidence surface 41 of the lenticular lens sheet 4 are scattered by the light diffusing material prior to reaching the light exit surface 42, thereby causing flare or stray light. On the other hand, in the transmission type screen shown in FIG. 4, since the base material 40 of the lenticular lens sheet 4 does not contain a light diffusing material, there is no fear of the light rays incident on the light incidence surface 41 being scattered by a light diffusing material prior to reaching the light exit surface 42 and thereby causing flare or stray light. As a result, the width, d, of the outgoing light rays in the vertical direction of the picture plane with respect to the incident light rays 14 when viewed from the image viewing side is generally recognized in terms of the width of light rays which appear on the light exit surface 22 of the Fresnel lens sheet 2, and thus it is smaller than the width, d, of light rays in the conventional transmission type screen, that is, there is no fear of image blur.

In the transmission type screen shown in FIG. 4, as mentioned previously, since the light rays incident on the light incidence surface 41 of the lenticular lens sheet 4 are not scattered by a light diffusing material prior to reaching the light exit surface 42, that is, flare or stray light is not produced, the image contrast and brightness are improved in comparison with the conventional transmission type screen. Further, since an extraneous light such as an illuminating light, if any, is not scattered by a light diffusing material, the image contrast is improved to a remarkable extent as compared with the conventional transmission type screen, and even in a light place, there is obtained a sharp image which is easier to see.

The following description concerns the directional characteristics of the transmission type screen 1. The conventional transmission type screen 1 shown in FIG. 26 has skirt-sweeping directional characteristics such that, in the lenticular lens sheet 4, as mentioned above, the projection image light rays are diffused in the vertical direction of the picture plane by the light diffusing material dispersed in the base material 40 of sheet 4, while in the horizontal direction of the picture plane the light rays are diffused by the first vertical lenticular lenses of the light incidence surface 41 and further diffused, although slightly, also by the fine particles of the light diffusing material.

On the other hand, in the base material 40 of the lenticular lens sheet 4 in the transmission type screen 1 of FIG. 4 of the present invention, a light diffusing material is not dispersed therein as mentioned above. Accordingly, if the shape of the horizontal lenticular lenses of the light incidence surface 21 in the Fresnel lens sheet 2, as well as the shape of the first vertical lenticular lenses of the light incidence surface 41 and that of the second vertical lenticular lenses of the light exit surface 42 both in the lenticular sheet 4, are made simply columnar or elliptic, there will occur cut-off without sweeping skirt in the directional characteristic in the vertical or horizontal direction of the picture plane of the screen, resulting in that at an angle exceeding a certain angular range, there is no projection image light and no image can be seen by the viewer.

In this embodiment, therefore, it is necessary that the horizontal lenticular lenses and the first and second vertical lenticular lenses be made aspherical in shape so as to afford a wide directional characteristic which sweeps skirt even in the absence of a light diffusing material. A specific example thereof will be described below.

Figure 7:
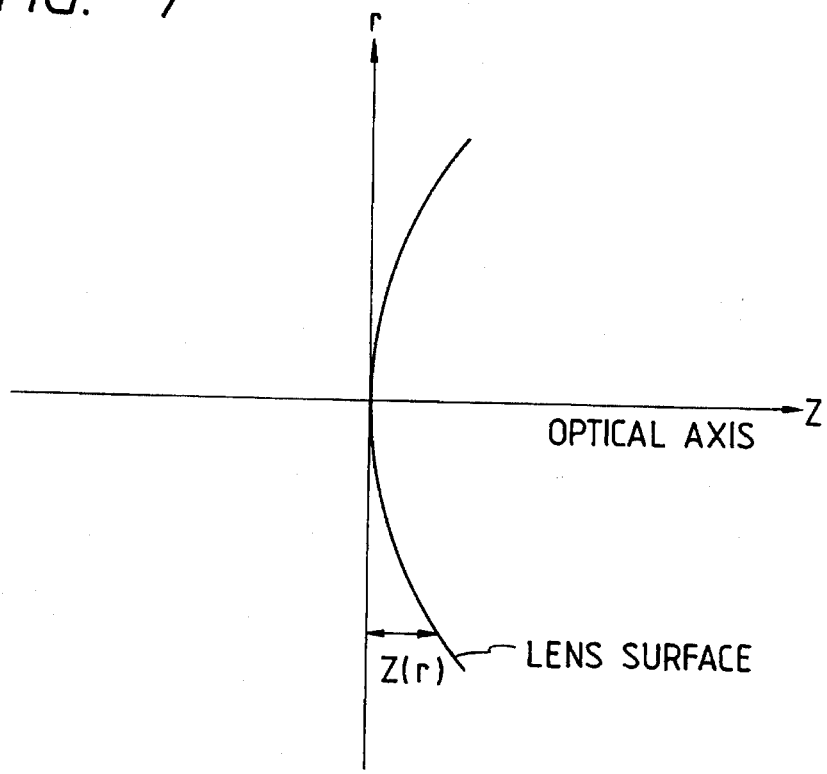
FIG. 7 is an explanatory view showing a coordinate system for defining an aspherical shape of a general lens.

FIG. 7 is an explanatory view showing a coordinate system for defining a general aspherical shape of lens. In FIG. 7, an optical axis direction of lens is assumed to be Z axis, and the light ray travelling direction is assumed to be a positive direction. Further, a radial axis perpendicular to Z axis is assumed to be r axis, and a radial distance from Z axis is assumed to be r. In this case, a surface shape Z(r) of lens is defined by the following equation 1:

$$Z(r) = \frac{r^2/RD}{1 + 1 - (1+CC) \cdot r^2/RD^2 + AE \cdot r^4 + AF \cdot r^6 + AG \cdot r^8 + AH \cdot r^{10}} \quad [\text{Equation 1}]$$

In equation 1, RD represents a radius of curvature, and CC, AE, AF, AG and AH represent aspherical coefficients. Although it is only up to a term of tenth degree of r that is shown in equation 1, this constitutes no limitation, and also as to a term of twelfth or larger even number degree, there may be made a similar setting. And also in such a case it is possible to obtain a lens surface symmetric with respect to the optical axis.

TABLE 1

| Lens Surface | Light Incidence Surface | Light Exit Surface |
| --- | --- | --- |
| Radius of Curvature, RD | 0.105 | −410.74 |
| Aspherical Coefficients | | |
| CC | 5.82 | 0.0 |
| AE | 0.0 | 0.0 |
| AF | 0.0 | 0.0 |
| AG | 0.0 | 0.0 |
| AH | 0.0 | 0.0 |
| Surface Separation | 2.0 | |
| Refractive Index | 1.570 | |

Figure 8:
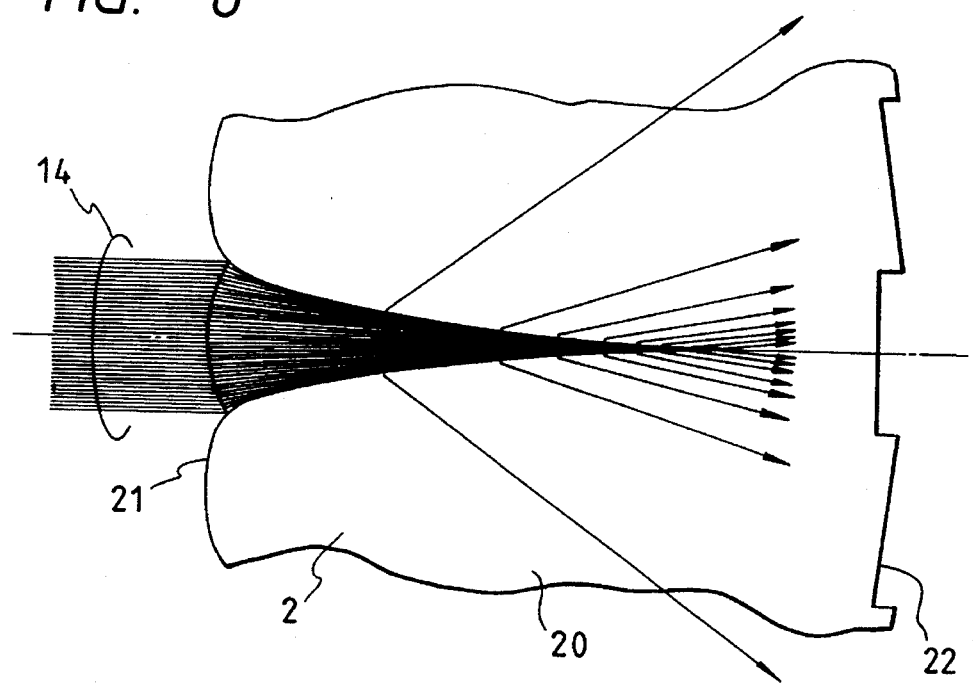
FIG. 8 is a sectional view showing the shape of a horizontally long lenticular lens obtained by Table 1.

FIG. 8 is a sectional view showing the shape of a horizontal lenticular lens obtained by Table 1.

Figure 9:
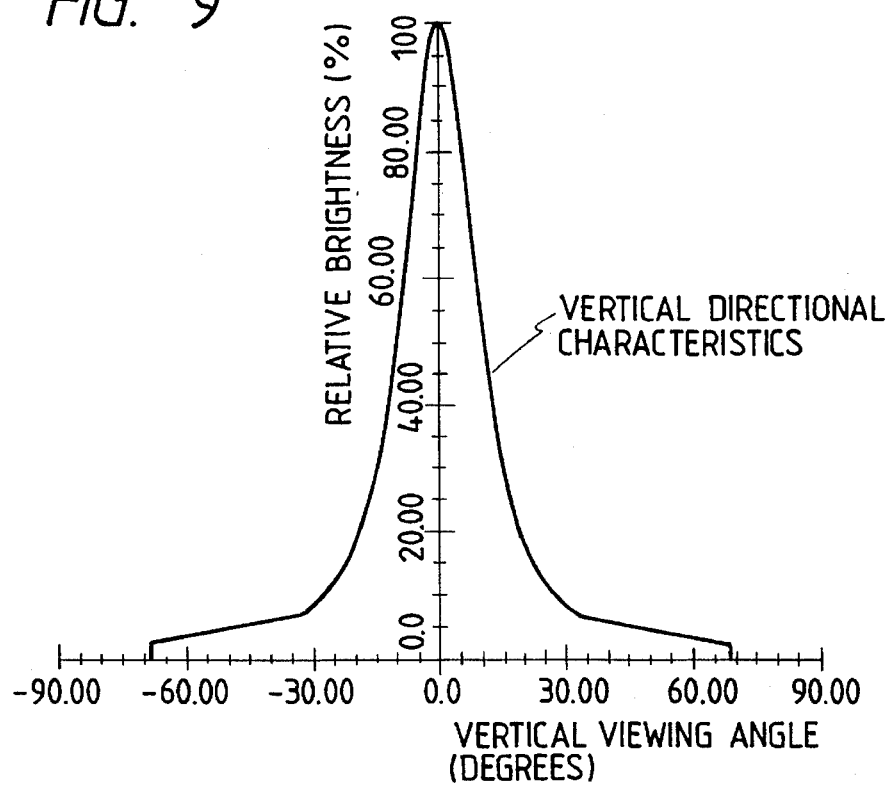
FIG. 9 is a characteristic diagram showing a directional characteristic (vertical directivity) in the vertical direction of the picture plane of the transmission type screen 1 in the case of using the shape of the horizontal lenticular lens obtained by Table 1.

FIG. 9 is a characteristic diagram showing a directional characteristic (vertical directivity) of the transmission type screen 1 in the vertical direction of the picture plane, obtained using the shape of a horizontal lenticular lens according to Table 1.

As shown in FIG. 9, in the vertical direction of the picture plane of the screen, it is possible to view images up to ±68° vertically from the image plane front direction. As to the luminance in the picture plane front direction, directions corresponding to a luminance of 50% are ±10° directions vertically from the picture plane front direction. Thus, there is obtained performance which is satisfactory in practical use.

Table 2 shows a specific example of a shape of each first vertical lenticular lens at the light incidence surface 41 and that of each second vertical lenticular lens at the light exit surface 42, in the lenticular lens sheet 4 according to this embodiment. Values of radius of curvature and of aspherical coefficients in equation 1 are set forth in the same table.

TABLE 2

| Lens Surface | Light Incidence Surface | Light Exit Surface |
| --- | --- | --- |
| Radius of Curvature, RD | 0.28845 | −0.20961 |
| Aspherical Coefficients | | |
| CC | −0.954 | −0.400 |
| AE | 5.2 | −0.156 |
| AF | −75.0 | 9.045 |
| AG | 1211.0 | 12000.0 |
| AH | −5653.0 | 1200000.0 |
| Surface Separation | 0.88 | |
| Refractive Index | 1.493 | |

Figure 10:
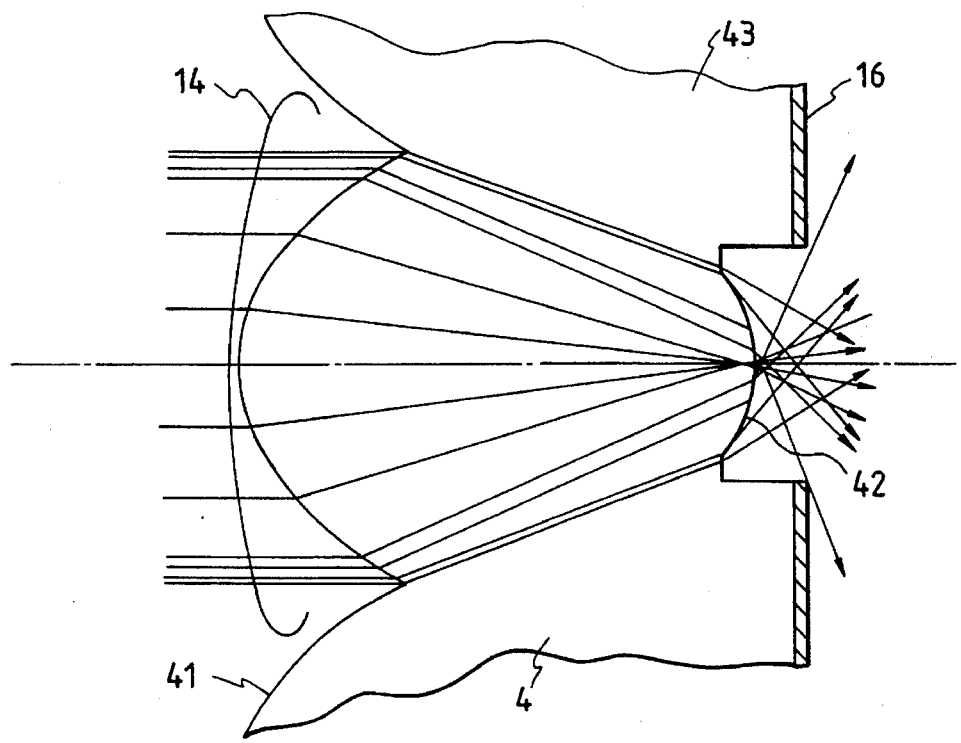
FIG. 10 is a sectional view showing the shapes of first and second vertically long lenticular lenses obtained by Table 2.

FIG. 10 is a sectional view showing the shape of a first vertical lenticular lens and that of a second vertically long lenticular lens both obtained by Table 2.

Figure 11:
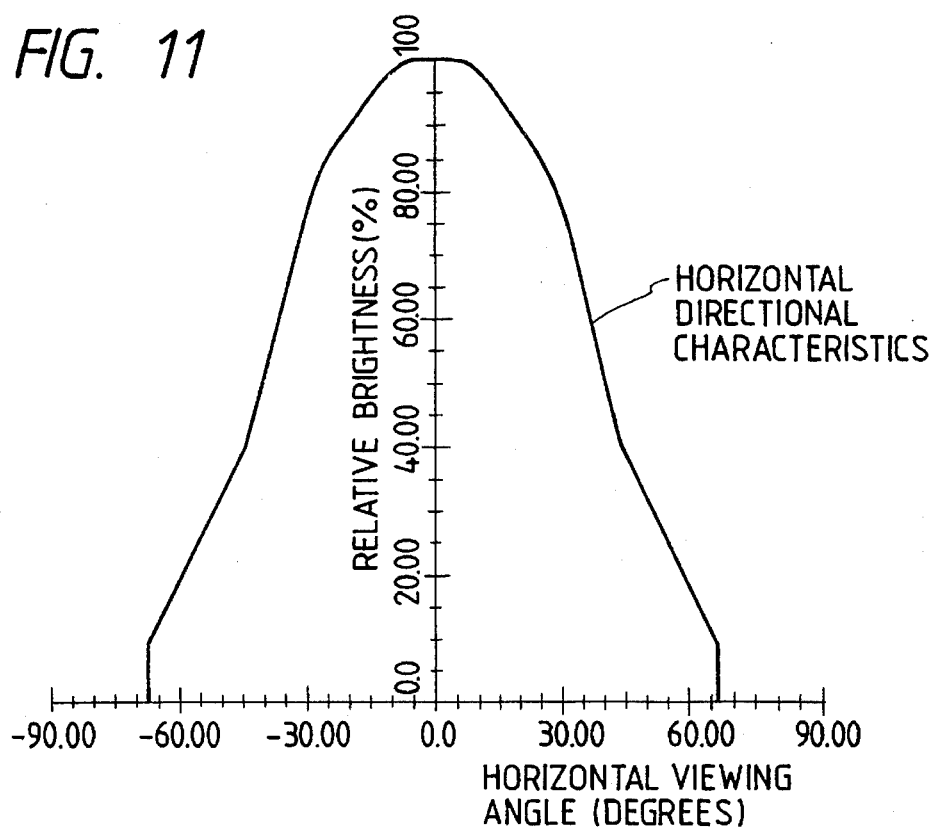
FIG. 11 is a characteristic diagram showing a directional characteristic (horizontal directivity) in the horizontal direction of the picture plane of the transmission type screen 1 in the case of using the shapes of the first and second vertically long lenticular lenses obtained by Table 2.

FIG. 11 is a characteristic diagram showing a directional characteristic (horizontal directivity) of the transmission type screen 1 in the horizontal direction of the picture plane of the screen, obtained using the shapes of first and second vertical lenticular lenses according to Table 2.

As shown in FIG. 11, in the horizontal direction of the picture plane, it is possible to view images up to ±67° right and left from the picture plane front direction. As to the luminance in the picture plane front direction, directions corresponding to a luminance of 50% are ±42° directions right and left from the picture plane front direction. Thus, there is obtained a satisfactory performance in practical use.

In the transmission type screen 1 described above, neither the Fresnel lens sheet 2 nor the lenticular lens sheet 4 contains a light diffusing material, and a transparent construction thereof is adopted. However, in order to further improve the image contrast, it is desirable to make the lenticular lens sheet 4 translucent.

In this case, the projection image light emitted from the image generation source side and reaching the image viewing side passes only once through the lenticular lens sheet 4, so the quantity of the light decreases in proportion to the transmittance of the sheet 4, while when an extraneous light such as illuminating light is reflected by the transmission type screen 1 and then reaches the image viewing side, it reciprocates at least once through the lenticular lens sheet 4 other than the light reflected by the light exit surface 42 of the sheet 4 which surface is positioned closest to the image viewing side, so that the quantity of the light decreases in proportion to the square of the transmittance of the lenticular lens sheet 4. Thus, the extraneous light is absorbed in a larger quantity than the projection image light and the proportion of its loss becomes larger, resulting in that the image contrast in the presence of an extraneous light such as illuminating light is improved.

In the transmission type screen 1 shown in FIG. 4, as set forth above, no light diffusing material is contained in the base material 40 of the lenticular lens sheet 4 and the thickness of the Fresnel lens sheet 2 is made small and substantially equal to that of the lenticular lens sheet 4, whereby it is made possible to improve the image contrast, diminish the blur of image, improve the brightness of image and enlarge the directional characteristic in the vertical direction of the screen image plane.

Figure 12A:
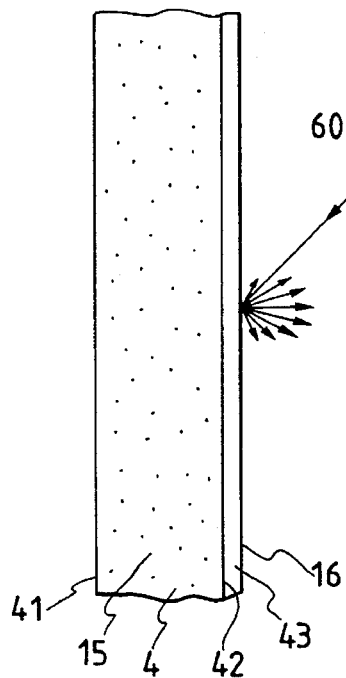
FIGS. 12(a) and 12(b) are conceptual diagrams showing extraneous light reflection intensity distributions each at a light absorbing band 16 of a lenticular lens sheet 4 in a transmission type screen 1, in a comparative manner between the prior art and the present invention.
Figure 12B:
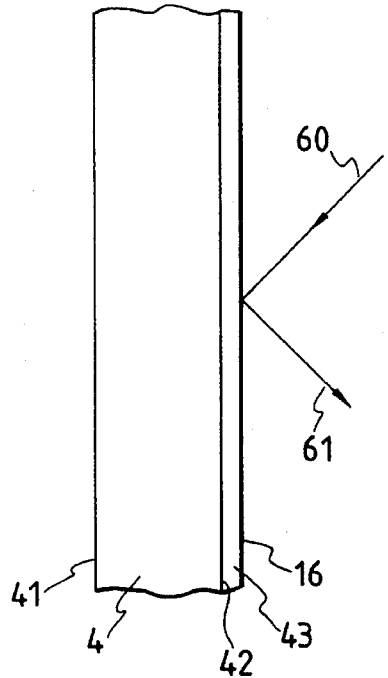

The following description concerns the relation between a high quality impression in the appearance of the rear projection type image display apparatus and the transmission type screen 1. FIGS. 12(a) and 12(b) are conceptual diagrams showing an extraneous light reflection intensity distribution in the light absorbing band 16 of the lenticular lens sheet 4 of the transmission type screen 1 in a comparative manner between the prior art and the present invention. FIG. 12(a) shows such distribution with respect to the transmission type screen 1 in the conventional rear projection type image display apparatus illustrated in FIG. 26, while FIG. 12(b) shows such distribution with respect to the transmission type screen 1 used in this embodiment of the present invention illustrated in FIG. 4.

In the transmission type screen 1 in the conventional rear projection type image display apparatus shown in FIG. 26, as described above, a convex portion 43 is provided between adjacent lenticular lenses of the light exit surface 42 in the lenticular lens sheet 4, and a light absorbing band (black stripe) 16 is laminated as a glossless or matte black colored layer onto the convex portion 43. Further, the lenticular lens sheet 4 has a light diffusing material. Therefore, on the image viewing side of the screen 1, a specular reflection of light occurs at neither the second vertical lenticular lens surfaces nor the light absorbing band 16, with only diffuse reflection. But in the presence of an extraneous light 60 such as illuminating light, about half of the extraneous light enters the light absorbing band 16 and most of the light incident on the light absorbing band 16 is absorbed by the same band other than only a limited portion thereof which is subjected to diffuse reflection, as shown in FIG. 12(a). Consequently, when no image is projected on the screen, the screen looks like a glossless or matte screen of a light black color as if ink were applied to the whole thereof, and thus the appearance of the rear projection type image display apparatus is deficient in providing a high quality impression.

On the other hand, in the transmission type screen 1 according to this embodiment of the present invention illustrated in FIG. 4, the lenticular lens sheet 4 does not contain a light diffusing material, so if the second vertical lenticular lens surfaces are finished as mirror surfaces and a lustrous or glossy black colored layer is used as the light absorbing band 16, then when the extraneous light 60 is reflected on the viewing side surface of the screen 1, a specular reflection component 61 is produced as shown as an example of reflection at the light absorbing band 16 in FIG. 12(b), thus giving rise to gloss and enhancing a high quality impression in the appearance of the rear projection type image display apparatus.

Figure 13:
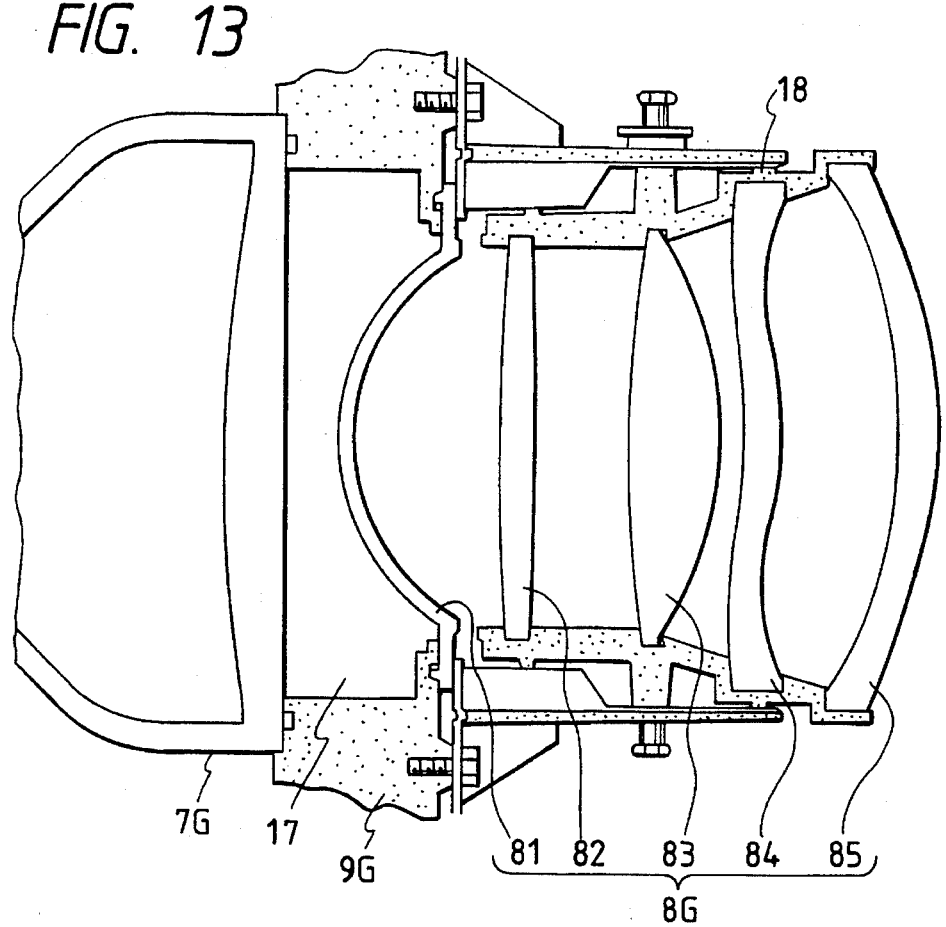
FIG. 13 is a sectional view of a connection between a projection type cathode-ray tube and a projection lens in the rear projection type image display apparatus shown in FIG. 1.

Next, the projection lens used in the rear projection type image display apparatus of this embodiment will be described. FIG. 13 is a sectional view of a connection between the projection type cathode-ray tube and the projection lens in the rear projection type image display apparatus of FIG. 1. In FIG. 13, reference numeral 18 denotes a lens barrel, and reference numerals 81, 82, 83, 84 and 85 denote first, second, third, fourth and fifth lens elements, respectively, of the projection lens 8G.

The first lens element 81 is a concave lens having a convex surface on the projection type cathode-ray tube 7G side and a concave surface on the transmission type screen side, with a liquid refrigerant 17 being sealed in the space between the lens element 81 and the cathode-ray tube 7G. The portion of the projection type cathode-ray tube 7G which is in contact with the liquid refrigerant 17 is usually made of glass, and the lens element 81 is formed of glass or plastic material. As the liquid refrigerant 17 there is used ethylene glycol, water, glycerin, or a mixture thereof.

The lens element 83 provides for a main enlarging action in the entire enlarging action of the projection lens 8G. As the material thereof it is desirable to use glass from the standpoint of less temperature variation and less deformation against temperature variation, provided there is made no limitation thereto. By designing so as to give the lens element 83 as large a diameter as possible and give an effective F value of the projection lens of, for example, 1.2 or so, it is made possible to enhance the brightness of image in the rear projection type image display apparatus.

The lens elements 82, 84 and 85 exhibit an aberration correcting action as a main action, and as the material thereof there may be used glass or plastic material, provided for the lens element 84 there is used a material having a refractive index varying characteristic (dispersion) relative to changes in wavelength of light which characteristic is different from that of the materials of the other lens elements, to effect correction of chromatic aberration. For example, glass which is small in dispersion and large in Abbe's number can be used as the material of the lens element 83; a material small in dispersion and large in Abbe's number such as a methacrylic resin can be used as the material of the lens elements 81, 82 and 85; and a material large in dispersion and small in Abbe's number such as a polycarbonate resin or a styrene resin can be used as the material of the lens element 84. In this case, if both faces of each of the lens elements 82, 84 and 85 are designed to be aspherical, there can be realized a projection lens superior in focusing characteristics and causing substantially no blur of image.

By making the diameter of the lens element 82 out of the above lens elements as large as possible, it is made possible to enhance the brightness of image at the marginal portion of the picture plane in the rear projection type image display apparatus.

On the other hand, as mentioned previously, in order to enlarge the field angle of the projection optical system for reducing the depth of the rear projection type image display apparatus, it is absolutely necessary to make such a lens design which shortens the focal length of the projection lens 8G. To this end, the overall length of the projection lens is made shorter, and, for example, in the case where a picture plane of 4.5 inches or so in diagonal length on the fluorescent screen of the projection type cathode-ray tube 7G is to be enlarged to a picture plane size of 35 inches or so on the projection type screen, it is preferable that the distance from the fluorescent screen of the cathode-ray tube 7G up to the light exit surface of the lens element 85 of the projection lens 8G be set at 130 mm or so. It has heretofore been known that the liquid refrigerant 17 has a function of radiating the heat generated from the projection type cathode-ray tube 7G, efficiently by convection heat transfer, and that it is effective in improving the image contrast.

More particularly, in the case where the liquid refrigerant 17 is not used and only the air is present between the cathode-ray tube 7G and the lens element 81, a portion of image light emitted from the cathode-ray tube 7G and reaching the lens element 81 becomes a stray light due to reflection loss at the boundary surface between the tube 7G and the liquid refrigerant 17 and also at the boundary surface between the liquid refrigerant 17 and the lens element 81. If this stray light reciprocates through the projection optical system or the housing of the rear projection type image display apparatus and thereafter reaches the transmission type screen, there will not be obtained a satisfactory image contrast.

On the other hand, in the presence of the liquid refrigerant 17, the refractive indices of the projection cathode-ray tube 7G, liquid refrigerant 17 and lens element 81 all assume values close to one another and close to 1.5, so the image light emitted from the cathode-ray tube 7G and reaching the lens element 8a undergoes an extremely small reflection loss at the boundary between the cathode-ray tube 7G and the liquid refrigerant 17 and also at the boundary between the liquid refrigerant 17 and the lens element 81, thus affording a good image contrast. In this case, by making the distance from the boundary surface between the cathode-ray tube 7G and the liquid refrigerant 17 up to the boundary between the liquid refrigerant 17 and the lens element 81 long, there can be attained an improvement of image contrast. For example, in the case where a picture plane of 4.5 inches or so on the fluorescent screen of the projection type cathode-ray tube 7G is to be enlarged to a picture plane size of 35 inches or so on the transmission type screen, it is desirable that the distance be approximately 9 mm or longer when the entire diameter of the projection lens 8G is 115 mm and the distance from the fluorescent screen of the projection type cathode-ray tube 7G up to the light exit surface of the lens element 85 in the projection lens 8G is about 130 mm.

It has heretofore been known that forming a dielectric multi-layer film as a reflection preventing film on the surface of each lens element as a constituent of the projection lens 8G, coloring the inner surface of the coupler 9G in glossless or matte black color, and coloring the inner surface of the lens barrel 18 also in glossless or matte black color, are all effective in improving the image contrast. Also for the projection lens 8G and coupler 9G shown in FIG. 13, it is desirable to apply any of such treatments thereto.

Although in FIG. 13 the fluorescent screen of the projection type cathode-ray tube 7G is concave on the projection lens 8G side, it may be planar.

Figure 14A:
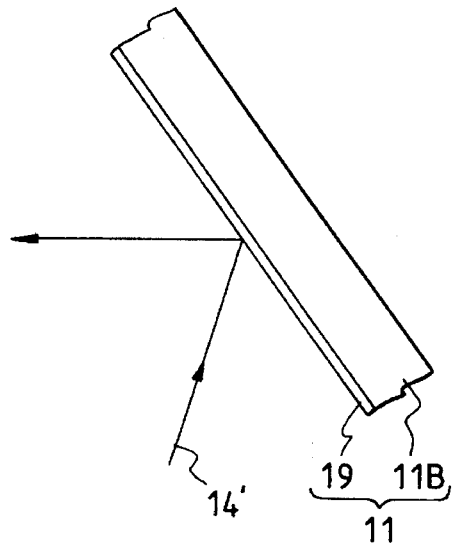
FIGS. 14(a) and 14(b) are sectional views of reflecting mirrors 11 used in rear projection type display apparatuses, in a comparative manner between the present invention and the prior art.
Figure 14B:
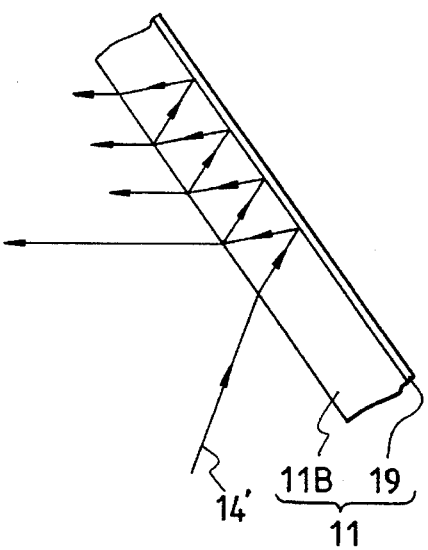

Now, the reflecting mirror used in the rear projection type image display apparatus of this embodiment of the present invention will be described. FIGS. 14(a) and 14(b) are sectional views of the reflecting mirror 11 used in the rear projection type image display apparatus, showing the section thereof in a comparative manner between the present invention and the prior art. FIG. 14(a) shows the section of the reflecting mirror 11 used in this embodiment of the present invention illustrated in FIG. 1, while FIG. 14(b) shows the section of the reflecting mirror 11 used in the conventional rear projection type image display apparatus.

The reflecting mirror 11 shown in FIG. 14(a) is of a construction wherein a photoreflective optical thin film is formed on the base member surface of the mirror on the side opposed to the projection lens 8G and transmission type screen 1, while the reflecting mirror 11 shown in FIG. 14(b) is of a construction wherein a photoreflective optical thin film is formed on the base member surface of the mirror on the side opposite to the side opposed to the projection lens 8G and screen 1.

In FIGS. 14(a) and 14(b), reference numeral 11B denotes a base member of the reflecting mirror 11, which base member is usually a glass plate, and reference numerals 14' and 19 denote an incident light ray and a photoreflective optical thin film, respectively.

In the reflecting mirror 11 shown in FIG. 14(b), the incident light ray 14' undergoes multiple reflection within the base member 11B of the reflecting mirror 11 and hence the reflected light expands, with the result that there occurs image blur on the transmission type screen 1 of the rear projection type image display apparatus.

On the other hand, in the reflecting mirror 11 shown in FIG. 14(a), the incident light ray 14' is reflected by the surface of the reflecting mirror 11 on the side opposed to the projection lens 8G and screen 1, so the reflected light does not expand and there is no fear of occurrence of image blur on the screen 1.

In the rear projection type image display apparatus of this embodiment, as will be apparent from the above description, by using the transmission type screen 1 shown in FIG. 4, the projection lens shown in FIG. 13 and the reflecting mirror 11 shown in FIG. 14(a), there is obtained an extremely good image contrast even in the presence of an extraneous light such as illuminating light, the entire image does not become whitish, nor does there occur image blur, and there is obtained a wide directional characteristic in the vertical direction of the picture plane of the screen. Further, it is possible to prevent the marginal portion of the picture plane from becoming dark, to shorten the depth of the apparatus and to provide an external appearance of a high quality impression with this construction.

The transmission type screen shown in FIG. 4 does not have a light diffusing material in the lenticular lens sheet 4, so in the case where an extraneous light such as illuminating light passes through the screen 1 and enters the housing 12, it will illuminate the interior of the housing 12 with a strong directivity without being scattered by a light diffusing material. At this time, if an unnecessary reflected light occurs within the housing 12, it will cause a lowering of image contrast. Therefore, it is necessary that the interior of the housing 12 be colored in black to prevent reflection.

In the above rear projection type image display apparatus, when the direction which permits viewing an image at the center of the picture plane in the brightest state is assumed to be a reference direction, there can be obtained directional characteristics such that the luminance of the picture plane center is not less than 50% of the luminance in the reference direction, in a horizontal direction of 42° relative to the reference direction, it is not less than 10% of the luminance in the reference direction, in a horizontal direction of 65° relative to the reference direction, it is not less than 50% of the luminance in the reference direction, in a vertical direction of 10° relative to the reference direction, and it is not less than 10% of the luminance in the reference direction, in a vertical direction of 25° relative to the reference direction. Moreover, as an image contrast in the presence of an extraneous light such as illuminating light, there can be obtained a contrast of not lower than 70. Further, as a relative light quantity of image at the marginal portion of the picture plane, there can be obtained a relative light quantity of not less than 30%.

Reference will be made below to measuring methods for directional characteristics of the rear projection type image display apparatus in this embodiment, image contrast, relative light quantity of image at the marginal portion of the picture plane, the degree of image blur and the surface gloss of the transmission type screen.

For measuring the surface gloss of the transmission type screen, an explanation thereof is omitted herein because such measurement can be effected on the basis of Japanese Industrial Standard "Mirror Surface Gloss Measuring Method" (JIS Z8741 1983, revised in 1983).

Figure 15:
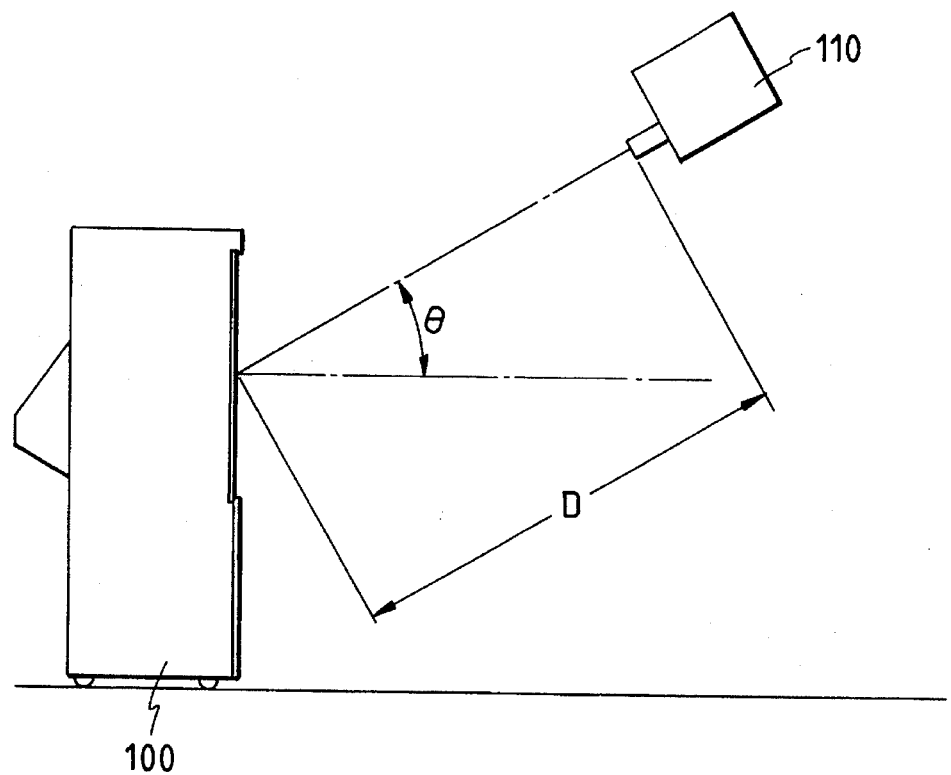
FIG. 15 is an explanatory view showing a positional relation between the rear projection type image display apparatus as an object to be measured and a measuring instrument in the measurement of a directional characteristic (vertical directivity) in the vertical direction of the picture plane of the screen in the image display apparatus.

The measurement of directional characteristics will now be described. FIG. 15 is an explanatory view showing a positional relation between the rear projection type image display apparatus as an object to be measured and a measuring instrument in measuring a directional characteristic (vertical directivity) in the vertical direction of the picture plane of the screen in the apparatus.

As shown in FIG. 15, the rear projection type image display apparatus 100, is placed upright on a solid floor. A luminance meter 110 as a measuring instrument is fixed onto a tripod (not shown) or the like through a tripod head or an inching base which is rotatable in the vertical direction. The luminance meter 110 is disposed so that the outermost lens surface of the luminance meter is located in the position of distance D from the picture plane center in a direction of a viewing angle θ vertically from the normal line direction of the picture plane center of the screen in the apparatus 100.

In the rear projection type image display apparatus 100, an image pattern of white projected on the entire picture plane is used as an image pattern in the measurement of a directional characteristic. This image pattern is based on a whilly white test video signal described in Japanese Industrial Standard "Television Receiver Testing Method" (JIS C6101-1988, revised in 1988), Chapter 2 (8).

In the measurement of a directional characteristic, the brightness of the picture plane center of the screen is measured while adjusting to a maximum degree both a contrast adjuster and a brightness adjuster in the image display apparatus 100 as an object to be measured.

In the above arrangement, D is set at 3 m and the luminance of the picture plane center is measured by the luminance meter 110 while the viewing angle θ is changed. As the luminance meter 110, there is used a spectroradiometer of Pritchard 1980B Type (a product of Photo Research Co., U.S.A.) or a product equivalent thereto, and the measurement is made at a field angle of 1° using a luminosity filter.

In this case, conversely to the above, by fixing the luminance meter 110 in a predetermined certain position and rotating the rear projection type image display apparatus 100 around the picture plane center of the screen, a relative positional relation can be made equal to that in the above measuring method, so such method may be adopted.

If necessary, two of the red, green and blue projection lenses in the image display apparatus 100 to be measured may each be covered with a shielding plate for shielding the projection light beam, and a directional characteristic may be measured for each of red, green and blue colors.

Figure 16:
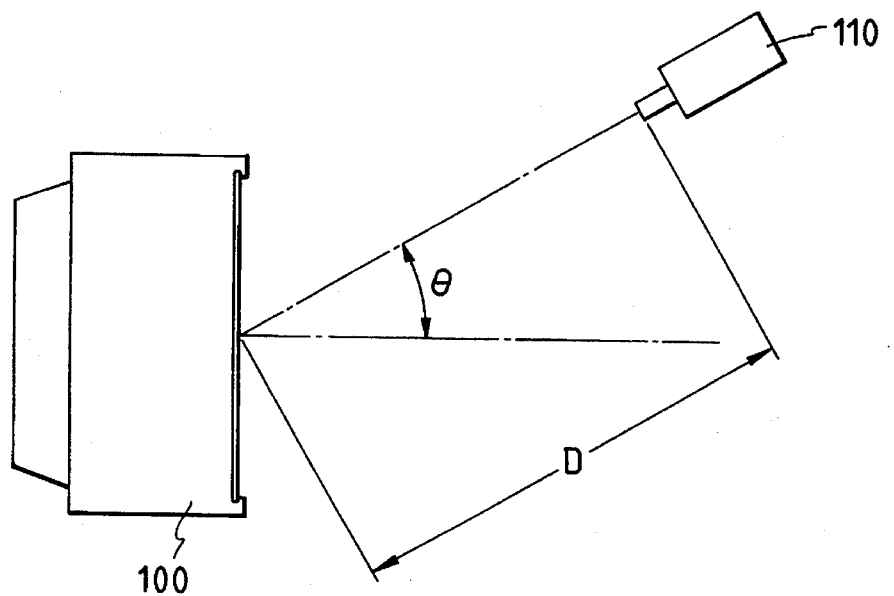
FIG. 16 is an explanatory view showing a positional relation between the rear projection type image display apparatus as an object to be displayed and a measuring instrument in the measurement of a directional characteristic (horizontal directivity) in the horizontal direction of the picture plane of the screen in the image display apparatus.

FIG. 16 is an explanatory view showing a positional relation between the rear projection type image display apparatus as an object to be measured and a measuring instrument in measuring a directional characteristic (horizontal directivity) in the horizontal direction of the picture plane of the screen in the image display apparatus.

A different point of this measurement from the foregoing measurement of a directional characteristic in the vertical direction of the screen picture plane resides only in the position of the luminance meter 110 as a measuring instrument. More specifically, the luminance meter 110 is disposed so that the outermost lens surface of the luminance meter is located in the position of distance D from the picture plane center in a direction of a viewing angle θ horizontally from the normal line direction of the picture plane center of the screen in the apparatus 100. In the above arrangement, D is set at 3 m and the luminance of the picture plane center is measured by the luminance meter 110 while the viewing angle θ is changed.

In this case, conversely to the foregoing, by fixing the luminance meter 110 in a predetermined certain position and rotating the rear projection type image display apparatus 100 around the picture plane center of the screen, a relative positional relation can be made equal to that in the foregoing measuring method, so there may be adopted such method.

Other measuring conditions are the same as in the measurement of a directional characteristic in the vertical direction of the screen picture plane.

The following description concerns measurement of the image contrast of an image.

Figure 17:
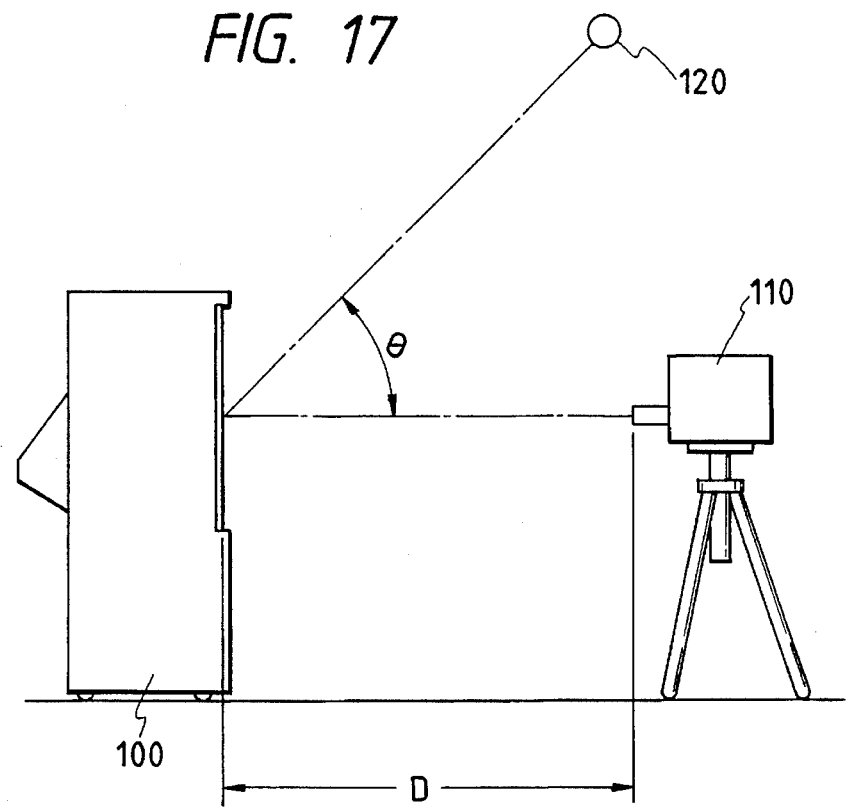
FIG. 17 is an explanatory view showing a positional relation among the rear projection type image display apparatus as an object to be measured, a measuring instrument and a lighting device in the measurement of an image contrast under lighting.

FIG. 17 is an explanatory view showing a positional relation among the rear projection type image display apparatus as an object to be measured, a measuring instrument and a lighting device in the measurement of an image contrast under lighting.

As shown in FIG. 17, the rear projection type image display apparatus 100 is installed upright on a solid floor. A luminance meter 110 as a measuring instrument is fixed onto a tripod or the like through a tripod head or an inching base which is rotatable in the horizontal direction, and the luminance meter is disposed so that the outermost lens surface thereof is located in the position of distance D in front of the picture plane center of the transmission type screen in the image display apparatus 100. As a lighting device 120, a straight tube type white fluorescent lamp for general use is disposed at an angle of θ upward from the normal line direction of the picture plane center. In this case, the fluorescent lamp is disposed in such a manner that a longitudinal direction of the fluorescent lamp is parallel to the horizontal direction of the picture plane of the image display apparatus 100 and that the normal line of the picture plane center is positioned just under the longitudinal center of the fluorescent lamp.

In the above arrangement, D is set at 3 m, θ at 45°, and the brightness of the fluorescent lamp is adjusted so that the illuminance I in the normal line direction at the picture plane center of the screen is 100 1×. The illuminance is measured using a digital illuminometer IM-3 (a product of TOPCON CORPORATION) or a digital illuminometer T-1 or T-1H (both manufactured by Minolta Camera Co., Ltd.). As the luminance meter 110 there is used a spectroradiometer of Pritchard 1980B Type (a product of Photo Research Co., U.S.A.) or a product equivalent thereto. With a luminosity filter mounted, the measurement is performed at a field angle of 1°.

Figure 18:
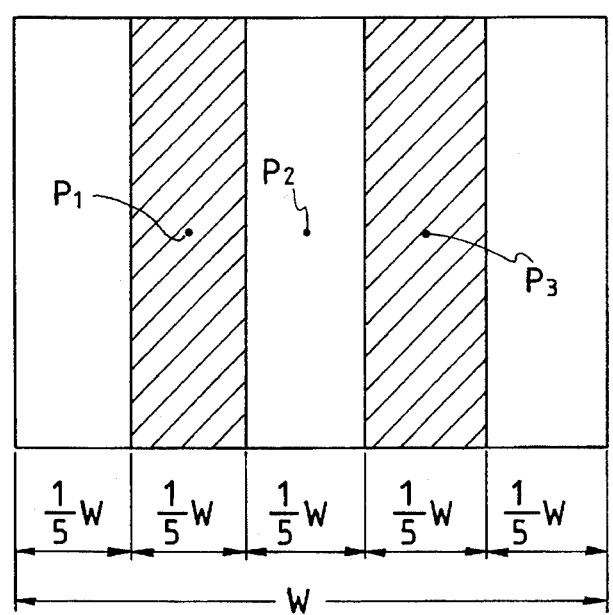
FIG. 18 is an explanatory view showing an example of an image pattern for measuring an image contrast in the rear projection type image display apparatus.

FIG. 18 is an explanatory view showing an example of an image pattern for measuring an image contrast of the rear projection type image display apparatus. This image pattern is a projected pattern of three white and two black stripes obtained by dividing a picture plane of W in width into five equal portions. It is based on the measuring pattern of large area and maximum contrast described in Japanese Industrial Standard "Television Receiver Testing Method" (JIS C6101-1971, revised in 1971), Chapter 6, Paragraph 1, Item 3 (2).

In measuring the contrast, the contrast adjuster in the image display apparatus 100 as an object to be measured is adjusted so that the white stripe portions of the above image pattern become the brightest, and the brightness adjuster of the apparatus 100 is adjusted to prevent the black stripe portions from becoming luminous. Thereafter, central points P1 and P3 of the black stripes and a white stripe central point P2 are measured for brightness while the luminance meter 110 is turned in the horizontal direction by means of the foregoing tripod head or inching base.

If the brightness of points P1, P2 and P3 are L1, L2 and L3, respectively, a contrast a is expressed by the following equation 2:

$$a = \frac{2 L2}{L1 + L3} \quad \text{[Equation 2]}$$

As an example, L2=200.7 cd(candle power)/m$^2$, L1=2.7 cd/m$^2$ and L3=2.7 cd/m$^2$ resulting in a value a of 74.3 utilizing equation 2.

Figure 19:
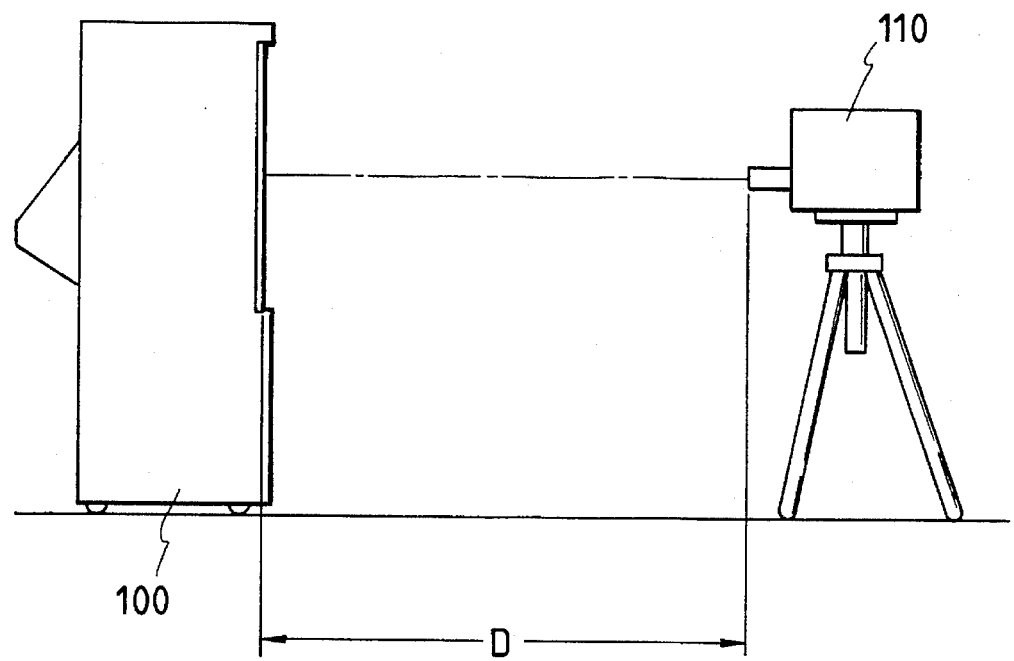
FIG. 19 is an explanatory view showing a positional relation between the rear projection type image display apparatus as an object to be measured and a measuring instrument in the measurement of a relative light quantity at the marginal portion of the picture plane in the image display apparatus.

The following description concerns measurement of a relative light quantity of image at the marginal portion of the picture plane. FIG. 19 is an explanatory view showing a positional relation between the rear projection type image display apparatus as an object to be measured and a measuring instrument in the measurement of a relative light quantity at the marginal portion of the picture plane.

As shown in FIG. 19, the rear projection type image display apparatus 100 is installed upright on a solid floor. A luminance meter 110 as a measuring instrument is fixed onto a tripod or the like through a tripod head or an inching base which is rotatable in both horizontal and vertical directions, and the luminance meter is disposed so that the outermost lens surface thereof is located in the position of distance D in front of the picture plane center of the transmission type screen in the display apparatus 100.

In the above arrangement, D is set at 3 m and measurement points on the picture plane which will be described later are measured for brightness by the luminance meter 110. As the luminance meter 110, there is used a spectroradiometer of Pritchard 1980B Type (a product of Photo Research Co., U.S.A.) or a product equivalent thereto, and with a luminosity filter mounted, the measurement is made at a field angle of 1°.

In the rear projection type image display apparatus 100, an image pattern with white projected throughout the entire picture plane is used as an image pattern in measuring a relative light quantity at the marginal portion of the picture plane as in the foregoing measurement of a directional characteristic, and the measurement is made while the contrast adjuster and the brightness adjuster of the image display adjuster as an object to be measured are each adjusted to a maximum degree.

Figure 20:
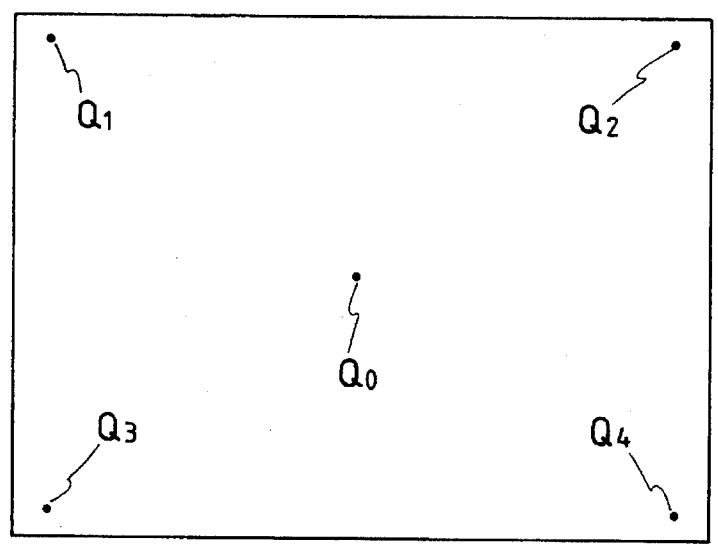
FIG. 20 is an explanatory view showing measurement points on the picture plane in the measurement of a relative light quantity at the marginal portion of the picture plane in the rear projection type image display apparatus.

FIG. 20 is an explanatory view showing measurement points on the picture plane in the measurement of a relative light quantity at the marginal portion of the picture plane in the rear projection type image display apparatus.

As shown in FIG. 20, points Q1, Q2, Q3 and Q4 at a relative image height of 0.9 in the diagonal directions of the picture plane, as well as a central point Q0 on the picture plane, are assumed to be measurement points. The relative image height just referred to represents a value obtained by scaling the distance from the picture plane center, provided one half of the diagonal length of the picture plane is assumed to be 1. The measurements Q1, Q2, 03 and Q4 are measured for luminance by turning the luminance meter 110 in the horizontal and vertical directions through the foregoing tripod head or inching base, and a ratio to the picture plane center point Q0 is determined.

If necessary, two of the red, green and blue projection lenses in the image display apparatus 100 as an object to be measured may be covered with a shielding plate for shielding the projection light beam, and a relative light quantity at the marginal portion of the picture plane may be measured for each of red, green and blue colors.

The following description concerns a measuring method for measuring the degree of image blur, in which the degree of image blur is measured in terms of a focus modulation transfer function characteristic (hereinafter referred to as "focus MTF characteristic").

The measurement is made by projecting only one scanning line of green onto the picture plane of the image display apparatus 100, then measuring a light output distribution in the vertical direction of the picture plane and subjecting the result to Fourier transform. This measurement is suitable for measuring combined characteristics of the projection type cathode-ray tube, projection lens, reflecting mirror and transmission type screen.

Figure 21:
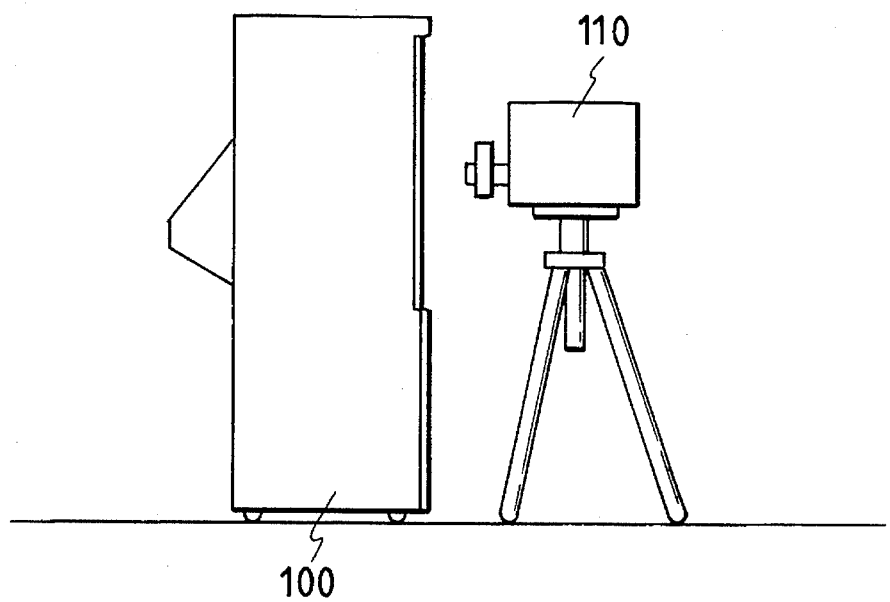
FIG. 21 is an explanatory view showing a positional relation between the rear projection type image display apparatus as an object to be measured and a measuring instrument in the measurement of a focus MTF characteristic of image in the image display apparatus.

FIG. 21 is an explanatory view showing a positional relation between the rear projection type image display apparatus as an object to be measured and a measuring instrument in the measurement of focus MTF characteristic of image in the image display apparatus.

As shown in FIG. 21, the rear projection type image display apparatus 100 is installed upright on a solid floor, and red and blue projection lenses in the apparatus 100 are each covered with a shielding plate for shielding the projection light beam to project only one scanning line of green. There is used a test video signal which causes only one scanning line of white to be projected on the picture plane. The luminance meter as a measuring instrument, indicated at 110, is fixed onto a large-sized XYZ stage or the like in such a manner that the optical axis of lens of the luminance meter is parallel to the normal line direction of the transmission type screen, and it is disposed on the image viewing side of the screen.

As the luminance meter 110 there is used a spectroradiometer of Pritchard 1980B Type (a product of Photo Research Co., U.S.A.), and with a luminosity filter and a microscanner SC-80A of the same company mounted, a light output distribution is measured at a field angle of 0.2° while scanning is performed in the vertical direction of the picture plane.

In the case where only the projection lens, reflecting mirror and transmission type screen other than the projection type cathode-ray tube in the rear projection type image display apparatus are to be measured for focus MTF characteristic, it is preferable that a light output distribution of an output image in the vertical direction of the picture plane relative to a slit image which is long in the horizontal direction of the picture plane, be measured and the result thereof be subjected to Fourier transform.

In this case, instead of the projection type cathode-ray tube, there is used a pseudo-face panel of the same shape as the face panel of the projection type cathode-ray tube. A fluorescent material is not applied to the surface of the pseudo-face panel corresponding to the fluorescent screen, but slits for measurement which will be described later are stuck directly on the glass surface. On the side of the pseudo-face panel opposite to the projection lens side, a projection type cathode-ray tube of green is disposed in proximity to the pseudo-face panel, to render the whole of the picture plane luminous.

Figure 22:
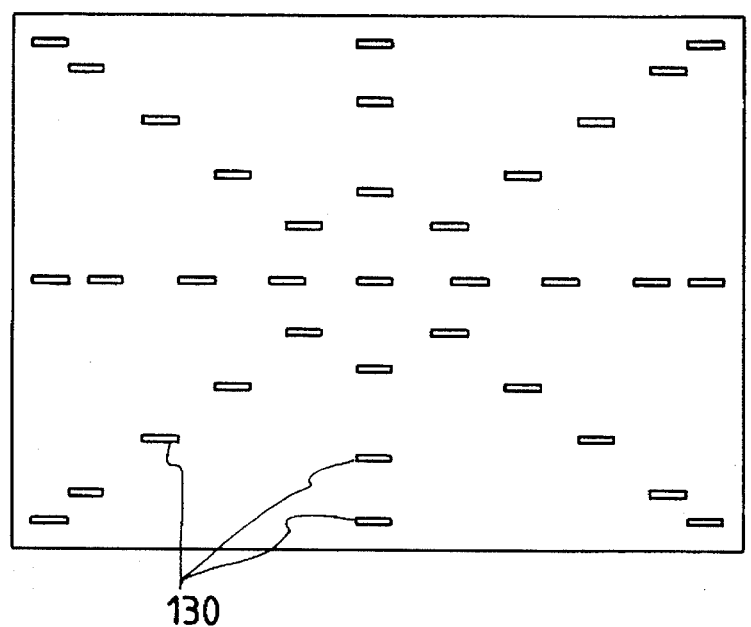
FIG. 22 is an explanatory view showing an example of slit image positions on the transmission type screen surface in the measurement of a combined focus MTF characteristic of projection lens, reflecting mirror and screen in the rear projection type image display apparatus.

FIG. 22 is an explanatory view showing an example of slit image positions on the surface of the transmission type screen in the measurement of a combined focus MTF characteristic of the projection lens, reflecting mirror and screen in the rear projection type image display apparatus.

As shown in FIG. 22, slit images 130 are formed so as to be displayed at the picture plane center as well as at points of 0.2, 0.4, 0.6 and 0.72 as points of relative image height (a value obtained by scaling the distance from the picture plane center, provided one half of the diagonal length of the picture plane is assumed to be 1) in the horizontal direction of the picture plane, at relative image height points of 0.2, 0.4 and 0.54 in the vertical direction of the picture plane and at relative image height points of 0.2, 0.4, 0.6, 0.8 and 0.9 in the diagonal directions of the picture plane. At the same time, slits of, for example, 0.5 mm in width are stuck on the fluorescent screen equivalent surface of the foregoing pseudo-face panel in the corresponding positions.

The measurement of a light distribution of each slit image in the vertical direction of the picture plane is performed by first moving the luminance meter 110 forward in the normal line direction of the slit and then making scan in the vertical direction of the picture plane using the foregoing microscanner in the same manner as in the case of FIG. 21 described previously.

Thus, description has been provided above about how to measure directional characteristics of the rear projection type image display apparatus in this embodiment, image contrast, relative light quantity of image at the marginal portion of the picture plane, the degree of image blur and the surface gloss of the transmission type screen.

Although the transmission type screen 1 shown in FIG. 4 has been described above as the transmission type screen 1 used in the rear projection type image display apparatus of this embodiment, the present invention is not limited to such condition. The transmission type screen 1 shown in FIG. 23 or FIG. 24 may be used.

Figure 23:
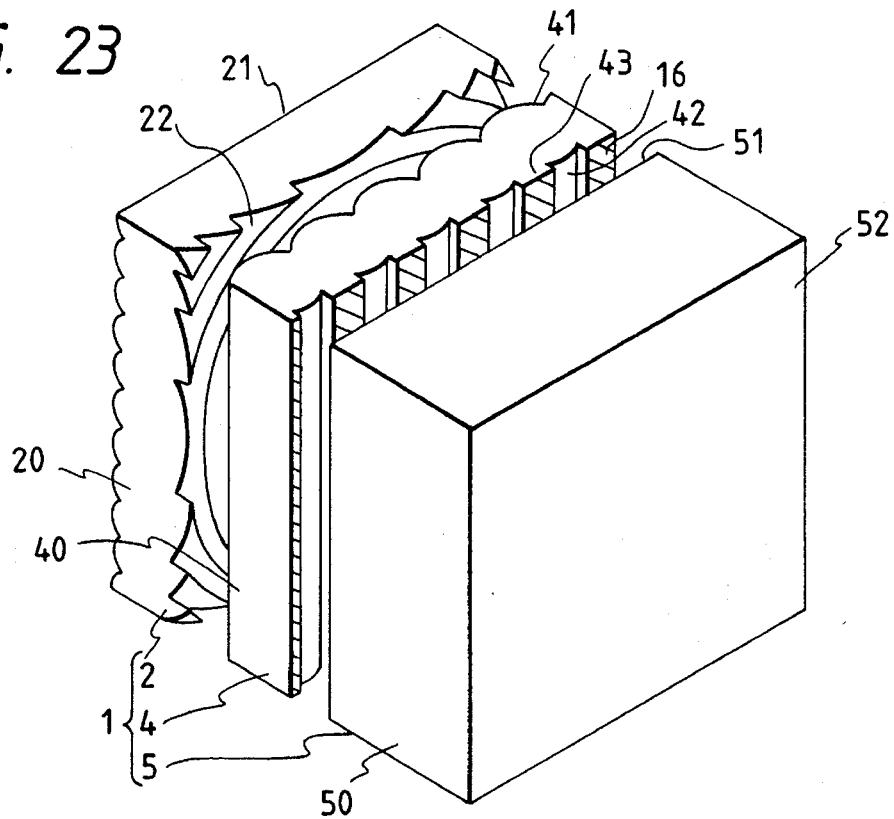
FIG. 23 is a perspective view showing a principal portion of another example of a transmission type screen 1 in the rear projection type image display apparatus of FIG. 1.

FIG. 23 is a perspective view showing a principal portion of another example of transmission type screen 1 in the rear projection type image display apparatus of FIG. 1.

In FIG. 23, reference numeral 5 denotes a light absorbing sheet, and reference numerals 51 and 52 denote a light incidence surface and a light exit surface, respectively, of the light absorbing sheet 5. Other portions common to FIG. 4 are indicated by the same reference numerals as in FIG. 4 and explanations thereof are omitted.

A different point of this embodiment from the transmission type screen 1 shown in FIG. 4 resides in that the light absorbing sheet 5 which is translucent is newly added as a constructional element on the image viewing side relative to the lenticular lens sheet 4, as shown in FIG. 23.

In this embodiment, like the embodiment shown in FIG. 4 wherein the lenticular lens sheet 4 of the transmission type screen 1 is translucent, the projection image light travelling from the image generation source side to the image viewing side passes only once through the light absorbing sheet 5, so that the quantity of the light decreases in proportion to the transmittance of the light absorbing sheet 5. On the other hand, when an extraneous light such as illuminating light is reflected by the screen 1 and reaches the image viewing side, the light reciprocates at least once through the light absorbing sheet 5 other than the light portion reflected by the light exit surface 52 as a surface closest to the viewer, so that the light quantity decreases in proportion to the square of the transmittance of the light absorbing sheet 5. Thus, the extraneous light is absorbed in a larger quantity than the projection image light and becomes larger in the loss proportion of light, whereby the image contrast in the presence of an extraneous light such as illuminating light is improved.

Figure 24:
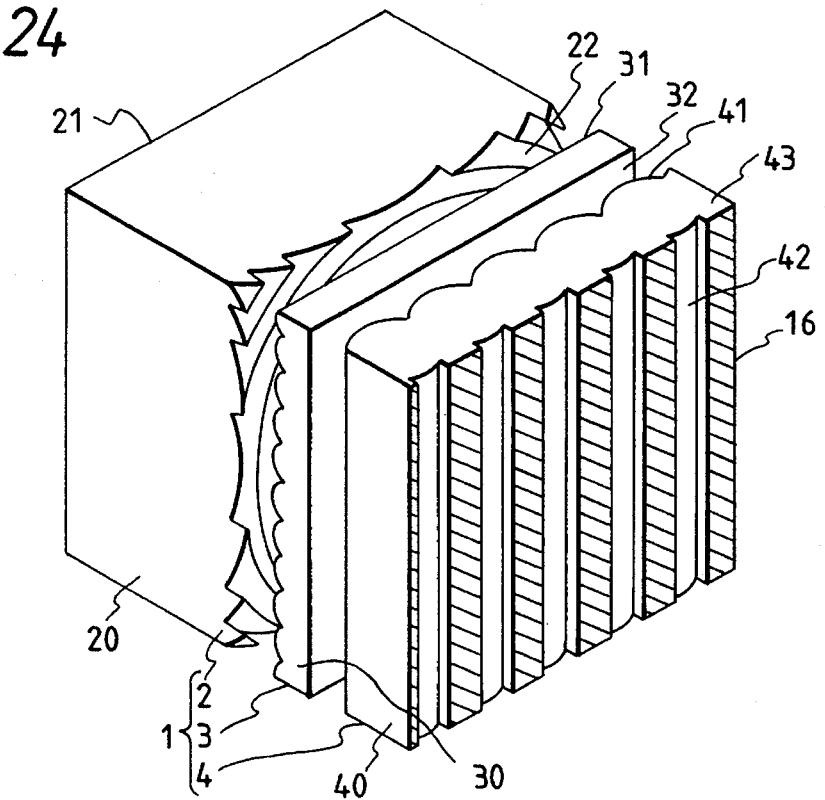
FIG. 24 is a perspective view showing a principal portion of a further example of a transmission type screen 1 in the rear projection type image display apparatus of FIG. 1.
Figure 25:
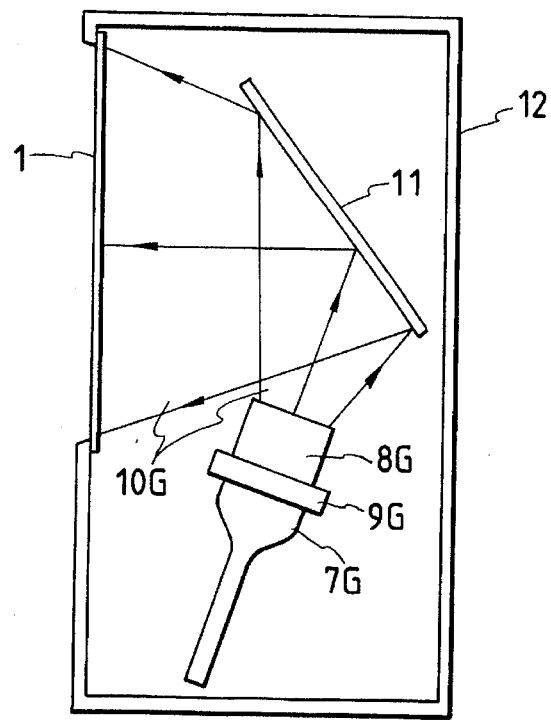
FIG. 25 is a sectional side view showing an internal construction of a rear projection type television receiver for domestic use as a conventional rear projection type image display apparatus.

FIG. 24 is a perspective view showing a principal portion of a further example of a transmission type screen 1 in the rear projection type image display apparatus of FIG. 1.

In FIG. 24, reference numeral 3 denotes a horizontal lenticular lens sheet, and reference numerals 31 and 32 denote a light incidence surface and a light exit surface, respectively, of the lenticular lens sheet 3. Other portions common to FIG. 4 are indicated by the same reference numerals as in FIG. 4 and explanations thereof are omitted.

This embodiment is different from the transmission type screen 1 shown in FIG. 4 in that, as shown in FIG. 24, the Fresnel lens sheet 2 has a plane light incidence surface 21 and that a thin, horizontal lenticular lens sheet 3 is newly added between the Fresnel lens sheet 2 and the lenticular lens sheet 4 as a constructional element of the screen 1.

In the transmission type screen 1 of this embodiment, instead of the light incidence surface 21 of the Fresnel lens 2, the light incidence surface 31 of the horizontal lenticular lens sheet 3 is provided with lenticular lenses which extend in the horizontal direction of the picture plane of the screen. Therefore, the start point of light diffusion in the horizontal direction of the picture plane and that of light diffusion in the vertical direction of the picture plane are closer to each other than in the transmission type screen 1 shown in FIG. 4, so that the blur of image is further diminished.

As to the image contrast, there is obtained the same effect as in the case of the transmission type screen 1 shown in FIG. 4. Particularly, a good contrast is obtained in the case where the lenticular lens sheet 4 is translucent.

According to the present invention, as set forth hereinabove, it is possible to provide a rear projection type image display apparatus and a transmission type screen used therein, superior in image contrast, and brightness at the marginal portion of the picture plane, exhibiting little blur of image, having a wide directional characteristic in the vertical direction of the picture plane, and further having a short depth and an external appearance of a high quality impression.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A rear projection type image display apparatus comprising at least one image generation source for displaying images, at least one projection lens for enlarging images displayed on the at least one image generation source and a transmission screen for displaying the enlarged images projected onto a rear portion of the transmission screen, the transmission screen of the image display apparatus enabling display of the images projected onto the transmission screen with a contrast of at least 70 in the presence of extraneous light.

2. A rear projection type image display apparatus according to claim 1, wherein the transmission screen enables display of the images with a field angle within a range of at least 72° to less than 100°.

3. A rear projection type image display apparatus according to claim 1, wherein the transmission screen includes a Fresnel lens sheet arranged for receiving the images enlarged and projected by the projection lens and a lenticular lens sheet proximate to the Fresnel lens sheet for enabling display of the images for viewing.

4. A rear projection type image display apparatus according to claim 3, wherein the Fresnel lens sheet includes a light incidence surface for receiving the projected images from the projection lens, and a light exit surface of a Fresnel lens, the lenticular lens sheet including a light incidence surface proximate to the Fresnel lens of the Fresnel lens sheet and having a plurality of first vertical lenticular lenses, the lenticular lens sheet having a light exit surface having a plurality of second vertical lenticular lenses, the plurality of second vertical lenticular lenses being separated from one another by a convex portion having a light absorbing band formed thereon.

5. A rear projection type image display apparatus according to claim 4, wherein the light absorbing band is a glossy layer.

6. A rear projection type image display apparatus according to claim 4, wherein a width of the Fresnel lens sheet is substantially equal to a width of the lenticular lens sheet.

7. A rear projection type image display apparatus according to claim 4, wherein the lenticular lens sheet is formed of a light transmissive material without fine particles of a light diffusing material therein.

8. A rear projection type image display according to claim 4, wherein the transmission screen further includes a plurality of horizontal lenticular lenses disposed one of (a) at the light incidence surface of the Fresnel lens sheet and (b) at a light incidence surface of another lenticular lens sheet disposed proximate to the light exit surface of the Fresnel lens sheet, the another lenticular lens sheet being disposed between the Fresnel lens sheet and the lenticular lens sheet.

9. A rear projection type image display apparatus according to claim 8, wherein the horizontal lenticular lenses of one of the Fresnel lens sheet and the another lenticular lens sheet have an aspherical oval shape, and at least one of the first and second vertical lenticular lenses of the lenticular lens sheet have an aspherical non-oval shape.

10. A rear projection type image display apparatus according to claim 4, wherein the transmission screen further includes a translucent light absorbent sheet disposed proximate to the light exit surface of the lenticular lens sheet.

11. A rear projection type image display apparatus according to claim 3, further comprising a reflecting mirror disposed for reflecting images from the projection lens onto the rear portion of the transmission screen, the reflecting mirror including a photoreflective optical thin film formed on a base member, the photoreflective optical thin film being disposed on a surface of the base member closer to the projection lens and the transmission screen than an opposite surface of the base member.

12. A rear projection type image display apparatus comprising at least one image generation source for displaying images, at least one projection lens for enlarging images displayed on the at least one image generation source and a transmission screen for displaying the enlarged images projected onto a rear portion of the transmission screen, the transmission screen of the image display apparatus enabling display for images projected onto the transmission screen with a relative luminance of images located at a marginal portion of a picture plane of the transmission screen with respect to a luminance of an image located at a center of the picture plane, which is not less than 30%, and enabling display of the image with a field angle within a range of at least 72° to less than 100°.

13. A rear projection type image display apparatus according to claim 12, wherein the transmission screen includes a Fresnel lens sheet arranged for receiving the images enlarged and projected by the projection lens and a lenticular lens sheet proximate to the Fresnel lens sheet for enabling display of the images for viewing.

14. A rear projection type image display apparatus according to claim 13, wherein the Fresnel lens sheet includes a light incidence surface for receiving the projected images from the projection lens, and a light exit surface of a Fresnel lens, the lenticular lens sheet including a light incidence surface proximate to the Fresnel lens of the Fresnel lens sheet and having a plurality of first vertical lenticular lenses, the lenticular lens sheet having a light exit surface having a plurality of second vertical lenticular lenses, the plurality of second vertical lenticular lenses being separated from one another by a convex portion having a light absorbing band formed thereon.

15. A rear projection type image display apparatus according to claim 14, wherein the light absorbing band is a glossy layer.

16. A rear projection type image display apparatus according to claim 14, wherein a width of the Fresnel lens sheet is substantially equal to a width of the lenticular lens sheet.

17. A rear projection type image display apparatus according to claim 14, wherein the lenticular lens sheet is formed of a light transmissive material without fine particles of a light diffusing material therein.

18. A rear projection type image display according to claim 14, wherein the transmission screen further includes a plurality of horizontal lenticular lenses disposed one of at the light incidence surface of the Fresnel lens sheet and at a light incidence surface of another lenticular lens sheet disposed proximate to the light exit surface of the Fresnel lens sheet, the another lenticular lens sheet being disposed between the Fresnel lens sheet and the lenticular lens sheet.

19. A rear projection type image display apparatus according to claim 18, wherein the horizontal lenticular lenses of one of the Fresnel lens sheet and the another lens sheet have an aspherical oval shape, and at least one of the first and second vertical lenticular lenses of the lenticular lens sheet have an aspherical non-oval shape.

20. A rear projection type image display apparatus according to claim 14, wherein the transmission screen further includes a translucent light absorbent sheet disposed proximate to the light exit surface of the lenticular lens sheet.

21. A rear projection type image display apparatus according to claim 13, further comprising a reflecting mirror disposed for reflecting images from the projection lens onto the rear portion for the transmission screen, the reflecting mirror including a photoreflective optical thin film formed on a base member, the photoreflective optical thin film being disposed on a surface of the base member closer to the projection lens and the transmission screen than an opposite surface of the base member.

22. A transmission screen for use in a rear projection type image display apparatus, the transmission screen having a glossy light absorbing layer, wherein the rear projection type image display apparatus comprises at least one image generation source for displaying images, at least one projection lens for enlarging images displayed on the at least one generation source and the transmission screen enables display of the enlarged images projected onto a rear portion of the transmission screen, wherein the transmission screen includes a Fresnel lens sheet arranged for receiving the images enlarged and projected by the projection lens and a lenticular lens sheet proximate to the Fresnel lens sheet for enabling display on the images for viewing, and wherein the Fresnel lens sheet includes a light incidence surface for receiving projected images from the projection lens, and a light exit surface of a Fresnel lens, the lenticular lens sheet including a light incidence surface proximate to the Fresnel lens of the Fresnel lens sheet and having a plurality of first vertical lenticular lenses, the lenticular lens sheet having a light exit surface having a plurality of second vertical lenticular lenses, the plurality of second vertical lenticular lenses being separated from one another by a convex portion having the glossy light absorbing layer thereon.

23. A rear projection type image display apparatus comprising a transmission screen having a glossy light absorbing layer, at least one image generation source for displaying images, at least one projection lens for enlarging images displayed on the least one generation source, the transmission screen enabling display of the enlarged images projected onto a rear portion of the transmission screen, the transmission screen including a Fresnel lens sheet arranged for receiving the images enlarged and projected by the projection lens and a lenticular lens sheet proximate to the Fresnel lens sheet for enabling display of the images for viewing, the Fresnel lens sheet including a light incidence surface for receiving projected images from the projection lens, and a light exit surface of a Fresnel lens, the lenticular lens sheet including a light incidence surface approximate to the Fresnel lens of the Fresnel lens sheet and having a plurality of first lenticular lenses, the lenticular lens sheet having a light exit surface having a plurality of second vertical lenticular lenses, a plurality of second vertical lenticular lenses being separated from one another by a convex portion having the glossy light absorbing layer thereon.

24. A rear projection type image display apparatus according to claim 23, wherein a width of the Fresnel lens sheet is substantially equal to a width of the lenticular lens sheet.

25. A rear projection type image display apparatus according to claim 23, wherein the lenticular lens sheet is formed of a light transmissive material without fine particles of a light diffusing material therein.

26. A rear projection type image display according to claim 23, wherein the transmission screen further includes a plurality of (a) horizontal lenticular lenses disposed one of at the light incidence surface of the Fresnel lens sheet and (b) at a light incidence surface of another lenticular lens sheet disposed proximate to the light exit surface of the Fresnel lens sheet, the another lenticular lens sheet being disposed between the Fresnel lens sheet and the lenticular lens sheet.

27. A rear projection type image display apparatus according to claim 26, wherein the horizontal lenticular lenses of one of the Fresnel lens sheet and the another lenticular lens sheet have an aspherical oval shape, and at least one of the first and second vertical lenticular lenses of the lenticular lens sheet have an aspherical non-oval shape.

28. A rear projection type image display apparatus according to claim 23, wherein the transmission screen further includes a translucent light absorbent sheet disposed proximate to the light exit surface of the lenticular lens sheet.

29. A rear projection type image display apparatus according to claim 23, further comprising a reflecting mirror disposed for reflecting images from the projection lens onto the rear portion of the transmission screen, the reflecting mirror including a photoreflective optical thin film formed on a base member, the photoreflective optical thin film being disposed on a surface of the base member closer to the projection lens and the transmission screen than an opposite surface of the base member.

30. A rear projection type image display apparatus comprising a transmission screen having a substantially smooth surface as a light exit surface, at least one image generation source for displaying images, at least one projection for enlarging images displayed on the at least one generation source, the transmission screen enabling display of the enlarged images projected onto a rear portion of the transmission screen, the transmission screen including a Fresnel lens sheet arranged for receiving the images enlarged and projected by the projection lens and a lenticular lens sheet proximate to the Fresnel lens sheet for enabling display of the images for viewing, the Fresnel lens sheet including a light incidence surface for receiving projected images from the projection lens, and a light exit surface of a Fresnel lens, the lenticular lens sheet including a light incidence surface approximate to the Fresnel lens of the Fresnel lens sheet and having a plurality of first vertical lenticular lenses, the lenticular lens sheet having a light exit surface having a plurality of second vertical lenticular lenses, a plurality of second vertical lenticular lenses having the substantially smooth surface and being separated from one another by a convex portion having a glossy light absorbing layer thereon.

31. A rear projection type image display apparatus according to claim 30, wherein a width of the Fresnel lens sheet is substantially equal to a width of the lenticular lens sheet.

32. A rear projection type image display apparatus according to claim 30, wherein the lenticular lens sheet is formed of a light transmissive material without fine particles of a light diffusing material therein.

33. A rear projection type image display apparatus according to claim 30, wherein the transmission screen further includes a plurality of horizontal lenticular lenses disposed one of at the light incidence surface of the Fresnel lens sheet and at a light incidence surface of another lenticular lens sheet disposed proximate to the light exit surface of the Fresnel lens sheet, the another lenticular lens sheet being disposed between the Fresnel lens sheet and the lenticular lens sheet.

34. A rear projection type image display apparatus according to claim 33, wherein the horizontal lenticular lenses of one of the Fresnel lens sheet and the another lenticular lens sheet have an aspherical oval shape, and at least one of the first and second vertical lenticular lenses of the lenticular lens sheet have an aspherical non-oval shape.

35. A rear projection type image display apparatus according to claim 30, further comprising a reflecting mirror disposed for reflecting images from the projection lens onto the rear portion of the transmission screen, the reflecting mirror including a photoreflective optical thin film formed on a base member, the photoreflective optical thin film being disposed on a surface of the base member closer to the projection lens and the transmission screen than an opposite surface of the base member.

36. A rear projection type image display apparatus comprising image generation means for generating and displaying images, projection lens means for projecting and enlarging images displayed on the image generation means and transmission screen means for transmitting and displaying the enlarged images projected onto a rear portion of the transmission screen means, the transmission screen means of the image display apparatus displaying the images projected onto the transmission screen means with a contrast of at least 70 in the presence of extraneous light.

37. A rear projection type image display apparatus according to claim 36, wherein a distance between the projection lens means and a rear portion of the transmission screen means is at least 9 mm.

38. A rear projection type image display apparatus according to claim 37, wherein the projection lens means has a field angle within a range of at least 72° to less than 100°.

39. A rear projection type image display apparatus according to claim 38, wherein the transmission screen means includes at least two sheets, the image generation means including a cathode ray tube, a liquid refrigerant being disposed between the projection lens means and the cathode ray tube, the projection lens means having a reflection preventing film on a surface thereof, a coupler for coupling the cathode ray tube and the at least one projection lens means, the coupler having an inner surface thereof colored with a glossless color, the projection lens means having a lens barrel with an inner surface colored in a glossless color, and a housing for the display apparatus having an interior thereof colored in black.

40. A rear projection type image display apparatus according to claim 39, wherein one sheet of the transmission screen means is a lenticular lens sheet which is translucent.

41. A rear projection type image display apparatus according to claim 39, wherein one sheet of the transmission screen means is a light absorbing sheet which is translucent on an image viewing side thereof.

42. A rear projection type image display apparatus according to claim 39, wherein one sheet of the transmission screen is a Fresnel lens sheet and the other sheet is a light diffusion sheet.

43. A rear projection type image display apparatus according to claim 39, wherein the transmission screen means includes a vertically long lenticular lens having a mirror surface as a light exit surface.

44. A rear projection type image display apparatus according to claim 40, wherein the lenticular lens sheet has a vertically long lenticular lens and a mirror surface as a light exit surface.

45. A rear projection type image display apparatus according to claim 42, wherein the light diffusion sheet includes a vertically long lenticular lens having a mirror surface as a light exit surface thereof.

46. A rear projection type image display apparatus according to claim 39, wherein the transmission screen means includes a vertically long lenticular lens having a glossy layer as a light exit surface thereof.

47. A rear projection type image display apparatus according to claim 40, wherein the transmission screen means includes a vertically long lenticular lens having a glossy layer as a light exit surface thereof.

48. A rear projection type image display apparatus according to claim 42, wherein the light diffusion sheet includes a vertically long lenticular lens having a glossy layer as a light exit surface thereof.

49. A rear projection type image display apparatus comprising image generation means for generating and displaying images, projection lens means for projecting and enlarging images displayed on the image generation means and transmission screen means of the image display apparatus for displaying projected onto the transmission screen means with a relative luminance of images located at a marginal portion of a picture plane of the transmission screen means with respect to a luminance of an image located at a center of the picture plane, which is not less than 30%, and for displaying of the image with a field angle within a range of at least 72° to less than 100°.

50. A rear projection type image display apparatus according to claim 49, wherein the transmission screen means provides a relative quantity of light of images located at the marginal portion of the picture plane of at least 30%, the projection lens means including at least first and second lens elements, the second lens element being a lens element of a size as large as possible.

51. A rear projection type image display apparatus according to claim 50, wherein the projection lens means has a field angle within a range of at least 72° to less than 100°.

52. A rear projection type image display apparatus according to claim 50, wherein the projection lens means includes a plurality of plastic lenses having different Abbe's numbers for providing aberration correcting action, and a reflecting mirror with a base member surface being provided on a side opposed to the projection lens means and the transmission screen means.

53. A rear projection type image display apparatus according to claim 52, wherein the projection lens means has a field angle within a range of at least 72° to less than 100°.

54. A transmission screen for use in a rear projection type image display apparatus, the transmission screen having a substantially smooth surface as a light exit surface, wherein the rear projection type image display apparatus comprises at least one image generation source for displaying images, at least one projection lens for enlarging images displayed on the at least one generation source and the transmission screen enables display of the enlarged images projected onto a rear portion of the transmission screen, wherein the transmission screen includes a Fresnel lens sheet arranged for receiving the images enlarged and projected by the projection lens and a lenticular lens sheet proximate to the Fresnel lens sheet for enabling display on the images for viewing, and wherein the Fresnel lens sheet includes a light incidence surface for receiving projected images from the projection lens, and a light exit surface of a Fresnel lens, the lenticular lens sheet including a light incidence surface proximate to the Fresnel lens of the Fresnel lens sheet and having a plurality of first vertical lenticular lenses, the lenticular lens sheet having a light exit surface having a plurality of second vertical lenticular lenses, the plurality of second vertical lenticular lenses having the substantially smooth surface and being separated from one another by a convex portion having a glossy light absorbing layer thereon.

* * * * *